(12) United States Patent
Rennuit et al.

(10) Patent No.: US 9,177,409 B2
(45) Date of Patent: Nov. 3, 2015

(54) ANIMATING A VIRTUAL OBJECT WITHIN A VIRTUAL WORLD

(75) Inventors: Antoine Félix Robert Rennuit, Oxford (GB); Thomas Daniel Lowe, Brisbane (AU)

(73) Assignee: NaturalMotion Ltd, Oxford (GB)

( * ) Notice: Subject to any disclaimer, the term of this patent is extended or adjusted under 35 U.S.C. 154(b) by 820 days.

(21) Appl. No.: 12/769,907

(22) Filed: Apr. 29, 2010

(65) Prior Publication Data

US 2011/0267358 A1 Nov. 3, 2011

(51) Int. Cl.
*G06T 13/00* (2011.01)
*G06T 13/40* (2011.01)

(52) U.S. Cl.
CPC ...................................... *G06T 13/40* (2013.01)

(58) Field of Classification Search
None
See application file for complete search history.

(56) References Cited

U.S. PATENT DOCUMENTS

| | | | | |
|---|---|---|---|---|
| 6,057,859 | A * | 5/2000 | Handelman et al. | 345/474 |
| 6,535,215 | B1 * | 3/2003 | DeWitt et al. | 345/473 |
| 6,683,612 | B2 * | 1/2004 | Miyamoto et al. | 345/474 |
| 6,714,201 | B1 * | 3/2004 | Grinstein et al. | 345/474 |

OTHER PUBLICATIONS

Rennuit et al.; "Passive control architecture for virtual humans;" IEEE/RSJ International Conference on Intelligent Robots and Systems, 2005 (IROS 2005); Aug. 2005; pp. 1432-1437.*

* cited by examiner

*Primary Examiner* — Edward Martello
(74) *Attorney, Agent, or Firm* — Schwegman Lundberg & Woessner, P.A.

(57) ABSTRACT

A method of animating a virtual object within a virtual world, wherein the virtual object comprises a plurality of object parts, wherein for a first object part there is one or more associated second object parts, the method comprising: at an animation update step: specifying a target frame in the virtual world; and applying control to the first object part, wherein the control is arranged such that the application of the control in isolation to the first object part would cause a movement of the first object part in the virtual world that reduces a difference between a control frame and the target frame, the control frame being a frame at a specified position and orientation in the virtual world relative to the first object part, wherein applying control to the first object part comprises moving the one or more second object parts within the virtual world to compensate for the movement of the first object part in the virtual world caused by applying the control to the first object part.

9 Claims, 28 Drawing Sheets

ANIMATING A VIRTUAL OBJECT WITHIN A VIRTUAL WORLD

FIELD OF THE INVENTION

The present invention relates to methods of animating a virtual object within a virtual world, a system for animating a virtual object within a virtual world, and a storage medium storing a computer program for carrying out such methods.

BACKGROUND OF THE INVENTION

Various methods of animating virtual objects within virtual worlds are well-known. Such methods have been employed in generating animations for computer games, films/movies, animation simulators, etc.

The animators who generate these animations (e.g. the developers of computer games who develop software for carrying out an animation during a computer game, or the creators of animations for use in a movie) will wish to control how the animations are performed. However, the level of control which an animator may have over the animation is often less than desired. It would therefore be desirable to be able to improve how control can be applied to a virtual object within a virtual world in order to animate that virtual object (e.g. provide a wider range of control options in order to give an animator or a computer program more flexibility when generating animations).

Additionally, computer-generated animations may sometimes look less than "natural" (i.e. somewhat "robotic") to a human observer who is used to seeing real-world motion. For example, a human observer is very used to seeing people walking around in the real-world and can therefore detect irregularities in (or unnatural characteristics of) a computer-generated simulation of a person walking. It would therefore be desirable to be able to improve how control can be applied to a virtual object within a virtual world in order to generate more natural-looking, convincing and realistic animations of virtual objects.

SUMMARY OF THE INVENTION

According to an aspect of the invention, there is provided a method of animating a virtual object within a virtual world, wherein the virtual object comprises a plurality of object parts, the method comprising: at an animation update step: specifying a target frame in the virtual world; and applying control to a first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially non-zero component along at most one or more degrees of freedom identified for the first object part.

In one embodiment, the specified position is not part of the first object part.

In one embodiment, each frame defines a respective origin and set of axes.

In one embodiment, each frame defines a respective location and orientation at that location.

In one embodiment, the control is a virtual wrench comprising a virtual force and/or virtual torque. The method may then comprise computing the control.

In one embodiment, the method comprises, at the animation update step receiving data specifying a desired-target frame in the virtual world; wherein specifying the target frame comprises specifying the target frame as an approximation of the desired-target frame, the approximation being such that movement of the first object part only along the one or more identified degrees of freedom is required to make the control frame coincide with the target frame.

In one embodiment, applying control to the first object part comprises simulating a connection between the control frame and the target frame, the connection having a resilience that reduces the difference between the control frame and the target frame, wherein the connection is constrained such that the resilience, in reducing the difference between the control frame and the target frame, can cause movement of the first object part that only has a substantially non-zero component along an identified degree of freedom of the first object part.

In one embodiment, each of the one or more identified degrees of freedom is, respectively, either a translational degree of freedom or a rotational degree of freedom for the first object part.

According to another aspect of the invention, there is provided a method of animating a virtual object within a virtual world, wherein the virtual object comprises a plurality of object parts, the method comprising: at an animation update step: specifying a target frame in the virtual world; and applying control to the first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially zero component along each of one or more degrees of freedom identified for the first object part.

In one embodiment, the specified position is not part of the first object part.

In one embodiment, each frame defines a respective origin and set of axes.

In one embodiment, each frame defines a respective location and orientation at that location.

In one embodiment, the control is a virtual wrench comprising a virtual force and/or virtual torque. The method may then comprise computing the control.

In one embodiment, the method comprises, at the animation update step receiving data specifying a desired-target frame in the virtual world; wherein specifying the target frame comprises specifying the target frame as an approximation of the desired-target frame, the approximation being such that, for each of the one or more identified degrees of freedom, movement of the first object part along that degree of freedom is not required to make the control frame coincide with the target frame.

In one embodiment, applying control to the first object part comprises simulating a connection between the control frame and the target frame, the connection having a resilience that reduces the difference between the control frame and the target frame, wherein the connection is constrained such that the resilience, in reducing the difference between the control frame and the target frame, cannot cause movement of the first object part that has a substantially non-zero component along an identified degree of freedom of the first object part.

In one embodiment, each of the one or more identified degrees of freedom is, respectively, either a translational degree of freedom or a rotational degree of freedom for the first object part.

According to another aspect of the invention, there is provided a method of animating a virtual object within a virtual world, wherein the virtual object comprises a plurality of object parts, wherein for a first object part there is a plurality of identified degree of freedom groupings, each degree of freedom grouping identifying one or more respective degrees of freedom of the first object part, the method comprising: at an animation update step, for each degree of freedom grouping: specifying a respective target frame in the virtual world; specifying a respective control frame in the virtual world, the control frame being a frame at a respective specified position and orientation in the virtual world relative to the first object part; and applying control to the first object part, wherein the control is arranged such that the application of the control in isolation to the first object part would cause a movement of the first object part in the virtual world that (a) reduces a difference between the respective control frame and the target frame and (b) either has a substantially zero component along each of the one or more identified degrees of freedom of that degree of freedom grouping or has a substantially non-zero component along at most the one or more identified degrees of that degree of freedom grouping.

According to another aspect of the invention, there is provided a method of animating a virtual object within a virtual world, wherein the virtual object comprises a plurality of object parts, wherein for a first object part there is one or more associated second object parts, the method comprising: at an animation update step: specifying a target frame in the virtual world; and applying control to the first object part, wherein the control is arranged such that the application of the control in isolation to the first object part would cause a movement of the first object part in the virtual world that reduces the difference between a control frame and the target frame, the control frame being a frame at a specified position and orientation in the virtual world relative to the first object part, wherein applying control to the first object part comprises moving the one or more second object parts within the virtual world to compensate for the movement of the first object part in the virtual world caused by applying the control to the first object part.

In one embodiment, the specified position is not part of the first object part.

In one embodiment, each frame defines a respective origin and set of axes.

In one embodiment, each frame defines a respective location and orientation at that location.

In one embodiment, the control is a first virtual wrench comprising a virtual force and/or virtual torque.

In one embodiment, for each of the one or more second object parts, moving that second object part comprises: computing a respective second virtual wrench comprising a respective virtual force and/or virtual torque; and applying the respective second virtual wrench to that second object part. For each of the one or more second object parts, computing the respective second virtual wrench may be dependent on the first virtual wrench. This may be carried out such that the sum of the effects at a particular location within the virtual world of the first virtual wrench and the respective second virtual wrench for each of the one or more second object parts is substantially zero.

In one embodiment, applying control to the first object part comprises simulating a connection between the control frame and the target frame, the connection having a resilience that reduces the difference between the control frame and the target frame; wherein moving each of the one or more second object parts at the animation update step comprises, for each of the one or more second object parts, moving that second object part so that the target frame is maintained at substantially the same location and orientation relative to that second object part during the animation update step. The resilience reducing the difference between the control frame and the target frame may cause at least a change of the location and/or orientation of the target frame, thereby moving the one or more second object parts. The method may then comprise, at the animation update step and prior to applying control to the first object part, updating the target frame such that the resilience, in reducing the difference between the control frame and the updated target frame would cause at least a change of the location and/or orientation of the updated target frame so as to substantially align the updated target frame with the initially specified target frame. Updating the target frame may then comprise: estimating the change of the location and/or orientation for the initially specified target frame that would result from the resilience reducing the difference between the control frame and the initially specified target frame at the animation update step; and updating the target frame by applying an inverse of the estimated change to the target frame.

According to another aspect of the invention, there is provided a method of animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, the method comprising: determining, for one or more of the plurality of joints, a corresponding target joint configuration based on a target configuration for the virtual object; determining a set of first virtual wrenches each comprising a respective virtual force and/or virtual torque for application to a respective object part, wherein the application of the set of first virtual wrenches to the respective object parts would cause each of the one or more of the plurality of joints to assume the corresponding target joint configuration; determining, for one or more of the plurality of object parts, a respective second virtual wrench comprising a virtual force and/or virtual torque, wherein, for each second virtual wrench, the application of that second virtual wrench to the respective object part would move that object part in the virtual world so as to reduce a difference between a current location and orientation of that object part and a target location and orientation for that object part, the target location and orientation being based on the target configuration for the virtual object; and for each of the determined first virtual wrenches, applying a weighted version of that first virtual wrench to the respective object part and for each of the determined second virtual wrenches, applying a weighted version of that second virtual wrench to the respective object part.

In one embodiment, the determined first virtual wrenches are each weighted by a first weight value and the determined second virtual wrenches are each weighted by a second weight value.

According to another aspect of the invention, there is provided a method of animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, the method comprising: determining, for the application of joint-space inverse-dynamics control to the virtual object based on a target configuration for the virtual object, one or more first virtual wrenches for application to respective object parts, wherein each of the first virtual wrenches comprises a respective virtual force and/or virtual torque; determining, for the application of task-space inverse-dynamics control to the virtual object based on the target configuration, one or more second virtual wrenches for application to respective object parts, wherein each of the second virtual wrenches comprises a respective virtual force and/or virtual torque; and for each of the determined first virtual wrenches, applying a weighted version of that first virtual wrench to the respective object part and for each of the determined second virtual wrenches, applying a weighted version of that second virtual wrench to the respective object part.

In one embodiment the determined first virtual wrenches are each weighted by a first weight value and the determined second virtual wrenches are each weighted by a second weight value.

According to another aspect of the invention, there is provided a method of animating a virtual object within a virtual world, the method comprising applying a weighted combination of task-space inverse-dynamics control and joint-space inverse-dynamics control to the virtual object.

According to another aspect of the invention, there is provided a system for animating a virtual object within a virtual world, wherein the virtual object comprises a plurality of object parts, the system comprising a processor arranged to, at an animation update step: specify a target frame in the virtual world; and apply control to a first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially non-zero component along at most one or more degrees of freedom identified for the first object part.

According to another aspect of the invention, there is provided a system for animating a virtual object within a virtual world, wherein the virtual object comprises a plurality of object parts, the system comprising a processor arranged to, at an animation update step: specify a target frame in the virtual world; and apply control to the first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially zero component along each of one or more degrees of freedom identified for the first object part.

According to another aspect of the invention, there is provided a system for animating a virtual object within a virtual world, wherein the virtual object comprises a plurality of object parts, the system comprising: a memory storing data defining, for a first object part, a plurality of identified degree of freedom groupings, each degree of freedom grouping identifying one or more respective degrees of freedom of the first object part; and a processor arranged to, at an animation update step, for each degree of freedom grouping: specify a respective target frame in the virtual world; specify a respective control frame in the virtual world, the control frame being a frame at a respective specified position and orientation in the virtual world relative to the first object part; and apply control to the first object part, wherein the control is arranged such that the application of the control in isolation to the first object part would cause a movement of the first object part in the virtual world that (a) reduces a difference between the respective control frame and the target frame and (b) either has a substantially zero component along each of the one or more identified degrees of freedom of that degree of freedom grouping or has a substantially non-zero component along at most the one or more identified degrees of that degree of freedom grouping.

According to another aspect of the invention, there is provided a system for animating a virtual object within a virtual world, wherein the virtual object comprises a plurality of object parts, the system comprising: a memory storing data defining, for a first object part, an association of that first object part with one or more associated second object parts; and a processor arranged to, at an animation update step: specify a target frame in the virtual world; and apply control to the first object part, wherein the control is arranged such that the application of the control in isolation to the first object part would cause a movement of the first object part in the virtual world that reduces a difference between a control frame and the target frame, the control frame being a frame at a specified position and orientation in the virtual world relative to the first object part, wherein applying control to the first object part comprises moving the one or more second object parts within the virtual world to compensate for the movement of the first object part in the virtual world caused by applying the control to the first object part.

According to another aspect of the invention, there is provided a system for animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, wherein the system comprises a processor arranged to, at an animation update step: determine, for one or more of the plurality of joints, a corresponding target joint configuration based on a target configuration for the virtual object; determine a set of first virtual wrenches each comprising a respective virtual force and/or virtual torque for application to a respective object part, wherein the application of the set of first virtual wrenches to the respective object parts would cause each of the one or more of the plurality of joints to assume the corresponding target joint configuration; determine, for one or more of the plurality of object parts, a respective second virtual wrench comprising a virtual force and/or virtual torque, wherein, for each second virtual wrench, the application of that second virtual wrench to the respective object part would move that object part in the virtual world so as to reduce a difference between a current location and orientation of that object part and a target location and orientation for that object part, the target location and orientation being based on the target configuration for the virtual object; and for each of the determined first virtual wrenches, apply a weighted version of that first virtual wrench to the respective object part and for each of the determined second virtual wrenches, apply a weighted version of that second virtual wrench to the respective object part.

According to another aspect of the invention, there is provided a system for animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, wherein the system comprises a processor arranged to, at an animation update step: determine, for the application of joint-space inverse-dynamics control to the virtual object based on a target configuration for the virtual object, one or more first virtual wrenches for application to respective object parts, wherein each of the first virtual wrenches comprises a respective virtual force and/or virtual torque; determine, for the application of task-space inverse-dynamics control to the virtual object based on the target configuration, one or more second virtual wrenches for application to respective object parts, wherein each of the second virtual wrenches comprises a respective virtual force and/or virtual torque; and for each of the determined first virtual wrenches, apply a weighted version of that first virtual wrench to the respective object part and for each of the determined second virtual wrenches, apply a weighted version of that second virtual wrench to the respective object part.

According to another aspect of the invention, there is provided a system for animating a virtual object within a virtual world, the system comprising a processor arranged to apply a weighted combination of task-space inverse-dynamics control and joint-space inverse-dynamics control to the virtual object.

According to another aspect of the invention, there is provided a storage medium storing a computer program which, when executed by a computer, carries out a method of animating a virtual object within a virtual world, wherein the virtual object comprises a plurality of object parts, the method comprising: at an animation update step: specifying a target frame in the virtual world; and applying control to a first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially non-zero component along at most one or more degrees of freedom identified for the first object part.

According to another aspect of the invention, there is provided a storage medium storing a computer program which, when executed by a computer, carries out a method of animating a virtual object within a virtual world, wherein the virtual object comprises a plurality of object parts, the method comprising: at an animation update step: specifying a target frame in the virtual world; and applying control to the first object part, wherein the control is arranged such that the application of the control in isolation to the first object part would cause a movement of the first object part in the virtual world that (a) reduces a difference between a control frame and the target frame, the control frame being a frame at a specified position and orientation in the virtual world relative to the first object part and (b) has a substantially zero component along each of one or more degrees of freedom identified for the first object part.

According to another aspect of the invention, there is provided a storage medium storing a computer program which, when executed by a computer, carries out a method of animating a virtual object within a virtual world, wherein the virtual object comprises a plurality of object parts, wherein for a first object part there is a plurality of identified degree of freedom groupings, each degree of freedom grouping identifying one or more respective degrees of freedom of the first object part, the method comprising: at an animation update step, for each degree of freedom grouping: specifying a respective target frame in the virtual world; specifying a respective control frame in the virtual world, the control frame being a frame at a respective specified position and orientation in the virtual world relative to the first object part; and applying control to the first object part, wherein the control is arranged such that the application of the control in isolation to the first object part would cause a movement of the first object part in the virtual world that (a) reduces a difference between the respective control frame and the target frame and (b) either has a substantially zero component along each of the one or more identified degrees of freedom of that degree of freedom grouping or has a substantially non-zero component along at most the one or more identified degrees of that degree of freedom grouping.

According to another aspect of the invention, there is provided a storage medium storing a computer program which, when executed by a computer, carries out a method of animating a virtual object within a virtual world, wherein the virtual object comprises a plurality of object parts, wherein for a first object part there is one or more associated second object parts, the method comprising: at an animation update step: specifying a target frame in the virtual world; and applying control to the first object part, wherein the control is arranged such that the application of the control in isolation to the first object part would cause a movement of the first object part in the virtual world that reduces a difference between a control frame and the target frame, the control frame being a frame at a specified position and orientation in the virtual world relative to the first object part, wherein applying control to the first object part comprises moving the one or more second object parts within the virtual world to compensate for the movement of the first object part in the virtual world caused by applying the control to the first object part.

According to another aspect of the invention, there is provided a storage medium storing a computer program which, when executed by a computer, carries out a method of animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, the method comprising: determining, for one or more of the plurality of joints, a corresponding target joint configuration based on a target configuration for the virtual object; determining a set of first virtual wrenches each comprising a respective virtual force and/or virtual torque for application to a respective object part, wherein the application of the set of first virtual wrenches to the respective object parts would cause each of the one or more of the plurality of joints to assume the corresponding target joint configuration; determining, for one or more of the plurality of object parts, a respective second virtual wrench comprising a virtual force and/or virtual torque, wherein, for each second virtual wrench, the application of that second virtual wrench to the respective object part would move that object part in the virtual world so as to reduce a difference between a current location and orientation of that object part and a target location and orientation for that object part, the target location and orientation being based on the target configuration for the virtual object; and for each of the determined first virtual wrenches, applying a weighted version of that first virtual wrench to the respective object part and for each of the determined second virtual wrenches, applying a weighted version of that second virtual wrench to the respective object part.

According to another aspect of the invention, there is provided a storage medium storing a computer program which, when executed by a computer, carries out a method of animating a virtual object within a virtual world, wherein the virtual object comprises a plurality of object parts, the plurality of object parts comprising a plurality of sections and a plurality of joints, each joint linking a corresponding one of the plurality of sections to another of the plurality of sections, the method comprising: determining, for the application of joint-space inverse-dynamics control to the virtual object based on a target configuration for the virtual object, one or more first virtual wrenches for application to respective object parts, wherein each of the first virtual wrenches comprises a respective virtual force and/or virtual torque; determining, for the application of task-space inverse-dynamics control to the virtual object based on the target configuration, one or more second virtual wrenches for application to respective object parts, wherein each of the second virtual wrenches comprises a respective virtual force and/or virtual torque; and for each of the determined first virtual wrenches, applying a weighted version of that first virtual wrench to the respective object part and for each of the determined second virtual wrenches, applying a weighted version of that second virtual wrench to the respective object part.

According to another aspect of the invention, there is provided a storage medium storing a computer program which, when executed by a computer, carries out a method of animating a virtual object within a virtual world, the method comprising applying a weighted combination of task-space inverse-dynamics control and joint-space inverse-dynamics control to the virtual object.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Architecture

Figure 1:
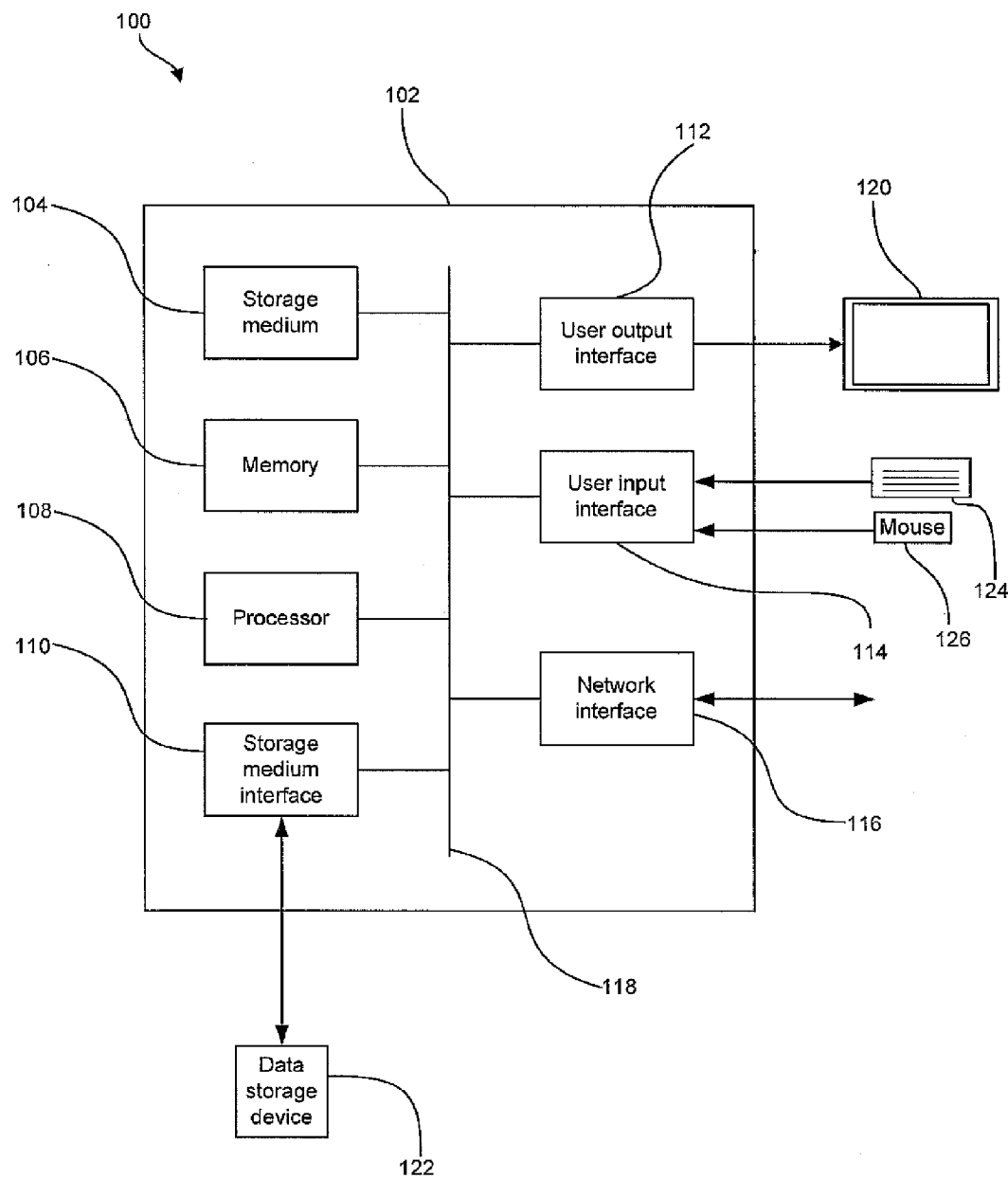
FIG. 1 schematically illustrates an example computer system according to an embodiment of the invention.

Embodiments of the invention may be executed by a computer system. FIG. 1 schematically illustrates an example computer system 100 according to an embodiment of the invention. The system 100 comprises a computer 102. The computer 102 comprises: a storage medium 104, a memory 106, a processor 108, a storage medium interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code) that form part of an embodiment of the invention.

The memory 106 may be any random access memory (storage unit or volatile storage medium) suitable for storing data and/or computer programs (or software or instructions or code) that form part of an embodiment of the invention.

The processor 108 may be any data processing unit suitable for executing one or more computer programs (such as those stored on the storage medium 104 and/or in the memory 106) which have instructions that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The storage medium interface 110 may be any unit for providing an interface to a data storage device 122 external to, or removable from, the computer 102. The data storage device 122 may be, for example, one or more of an optical disc, a magnetic disc, a solid-state-storage device, etc. The storage medium interface 110 may therefore read data from, or write data to, the data storage device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices. The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112.

Finally, the network interface 116 provides functionality for the computer 102 to download data from and/or upload data to one or more data communication networks (such as the Internet or a local area network).

It will be appreciated that the architecture of the system 100 illustrated in FIG. 1 and described above is merely exemplary and that other computer systems 100 with different architectures and additional and/or alternative components may be used in embodiments of the invention.

2—Animations and Data for Animations

Figure 2:
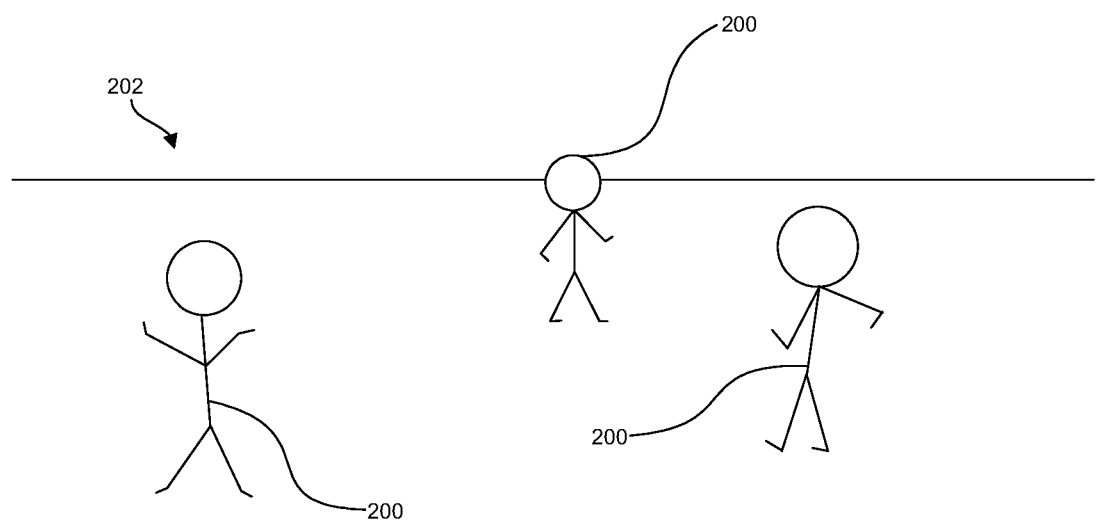
FIG. 2 schematically illustrates example virtual objects within a virtual world.

Embodiments of the invention are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments of the invention are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest—for the rest of this description, the time-points shall be assumed to correspond to video frames, but it will be appreciated that this is only an example and should not be taken as limiting. For example, in some embodiments, one or more animation update steps may be carried out between successive video frames/fields and this number may or may not be constant over time. It will be appreciated that the display frequency (i.e. the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of the present invention. The object attributes for an object 200 may be represented by some or all of the following data (depending on the type of animation and how the object 200 and its attributes are to be represented): (a) topological data; (b) geometric data; (c) physical data; (d) trajectory data; (e) skinning data; and (f) rendering data. These data are described in more detail below. It will be appreciated that the object 200 may have attributes in addition to, or as alternatives to, the attributes as described further below with reference to the various data (a)-(f).

Figure 3:
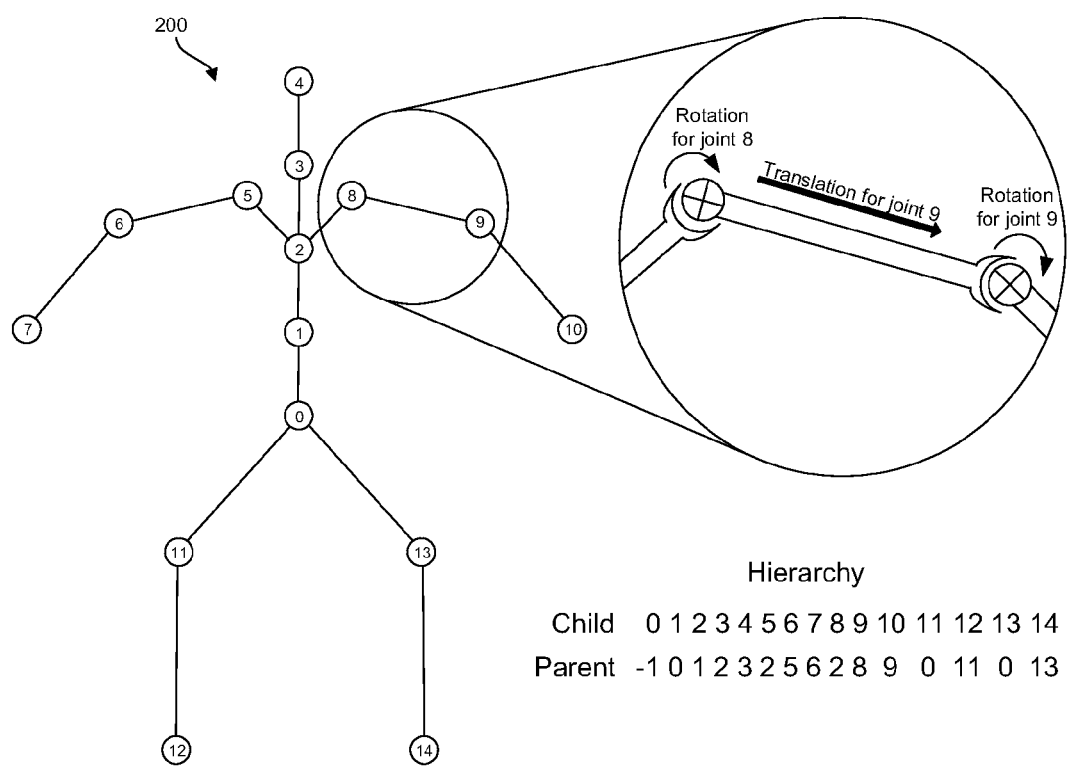
FIG. 3 schematically illustrates an object for an animation according to an embodiment of the invention.

FIG. 3 schematically illustrates an object 200 for an animation according to an embodiment of the invention. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) it is associated with.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments of the invention and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework, for the object 200.

The object parts (joints in this representation) are linked together, or are associated with each other, in a hierarchy. The hierarchy of joints illustrated in FIG. 3 may be represented by table 1 below:

TABLE 1

| | Joint ID | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Parent ID | −1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

Figure 4:
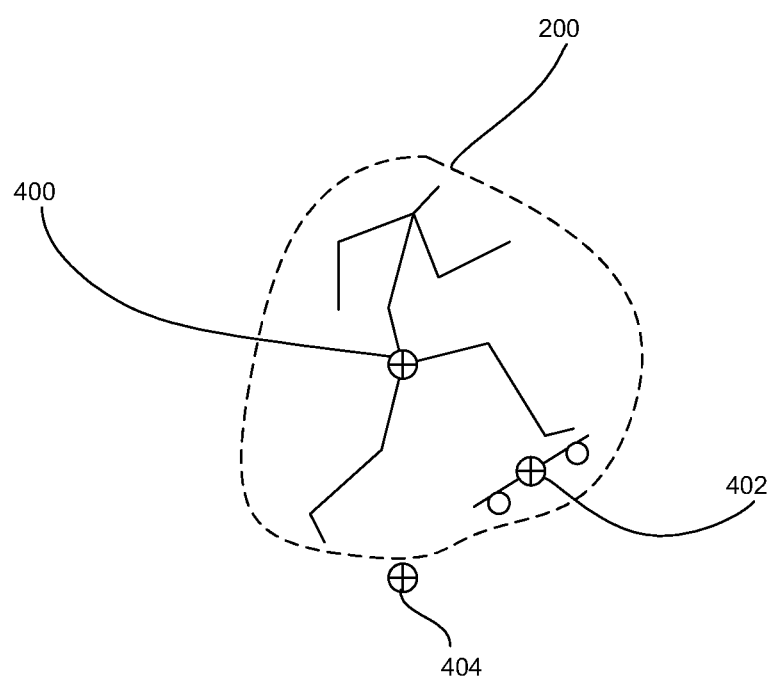
FIG. 4 schematically illustrates a compound object.

An object may have multiple root joints. For example, FIG. 4 schematically illustrates a compound object 200 representing a person on a skateboard. This may be considered as being one object as the person and the skateboard may be considered to be one set of semantically linked data (i.e. a single character). However, as the person and the skateboard are not rigidly or permanently attached to each other, they each have their own root joints, namely a root joint 400 for the person and a root joint 402 for the skateboard. The joints for the person will then be hierarchically related to the root joint 400, whilst the joints for the skateboard will be hierarchically related to the root joint 402.

The topological data for the object 200 is data that represents this hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments of the invention, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The attribute of the object 200 represented by the trajectory data is the location and orientation in the virtual world 202 of a so-called "trajectory joint" 404 for the object 200 (shown in FIG. 4 but not shown in FIG. 3). The trajectory joint 404 is used as a representative location of the object 200 within the world 202. Thus, different values for the trajectory data place the trajectory joint 404 (and hence the object 200) at different locations in the virtual world 202.

The trajectory joint 404 is usually not an actual joint of the object 200 (i.e. it need not form part of the structure of the object 200), but is simply a position and orientation within the world 202 to represent the overall location and orientation for the object 200. For convenience, the trajectory joint 404 may be represented as a "special" joint within the hierarchy represented by the topological data. The trajectory joint 404 need not be a root joint (with no parent) but can be located anywhere within the skeleton topology as represented by the topological data. However, it is generally the location and orientation of the joints of the object 200 (as specified by virtue of the topological data and the geometric data) relative to the trajectory joint 404 that is important as this results in a particular joint or object section being at a particular/absolute position and orientation within the entire virtual world 202. One way of viewing or implementing this is for all joints of the object 200 (as specified by the topological data), including root joints, to be ultimately parented to the trajectory joint 404 so that their location and orientation within the virtual world 202 can be calculated based on the trajectory data, the topological data and the geometric data.

The orientation of a trajectory joint 404 is just as important as its position, as it represents the overall direction that the object 200 is "facing".

Figure 5:
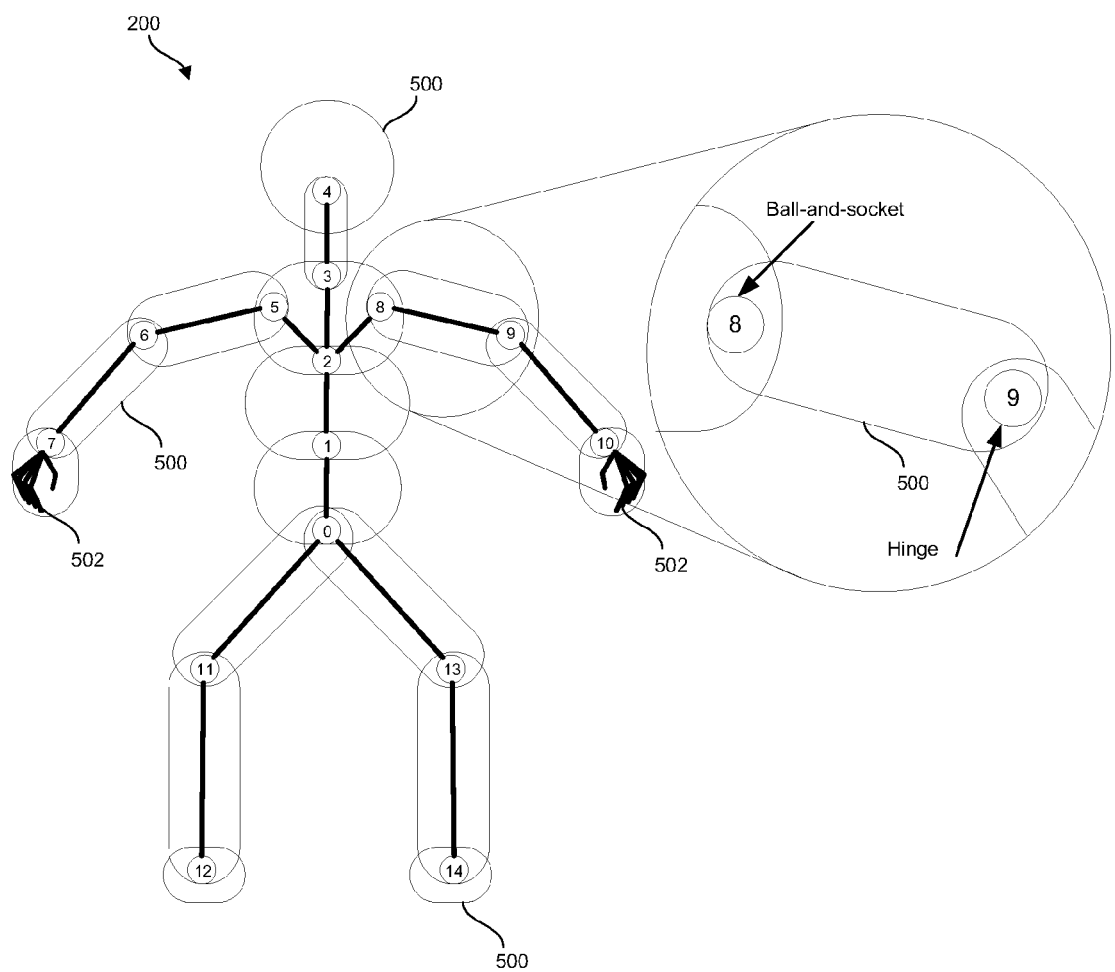
FIG. 5 schematically illustrates regions around joints of the object of FIG. 3 as defined by physical data for the object of FIG. 3.

The physical data represents various physical attributes for the object 200. These physical attributes represent or impose various physical properties or restrictions or limitations on the object 200. Typically, subsets of the physical data are associated with respective joints represented by the topological data. For example, one or more of the joints (or bones) represented by the topological data may have corresponding physical data representing attributes such as:

Size and shape of a region around that joint. The region may be a capsule or a cylinder, with the size and shape being defined by lengths and radii accordingly. The region may represent the body, or the "bulk", of the object 200 that is supported by the framework of bones and joints. If another object 200 were to enter, penetrate or perhaps even just contact this region, then the two objects 200 may be considered to have collided. FIG. 5 schematically illustrates such regions 500 for the joints for the object 200.

A mass for the joint.

An inertia property for the joint.

Other properties of the joint such as stiffness, damping factors, type of joint. For example, the "shoulder" joint 8 in FIG. 5 may be a ball-and-socket joint whilst the "elbow" joint 9 in FIG. 5 may be a hinge joint. Such data may therefore restrict or constrain how one joint may move (e.g. hinge or rotate or pivot) with respect to another joint (a parent or a child joint).

However, as shown in FIG. 5, some of the joints 502 represented by the topological data may not have corresponding physical attributes.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well-known in this field of technology and shall not be described in more detail herein—it actually outputs or displays the skinned surface with relevant textures, colours, lighting, etc. as appropriate. The rendering data is therefore data defining the textures, colours, lighting, etc., which are attributes of the object 200.

Figure 6:
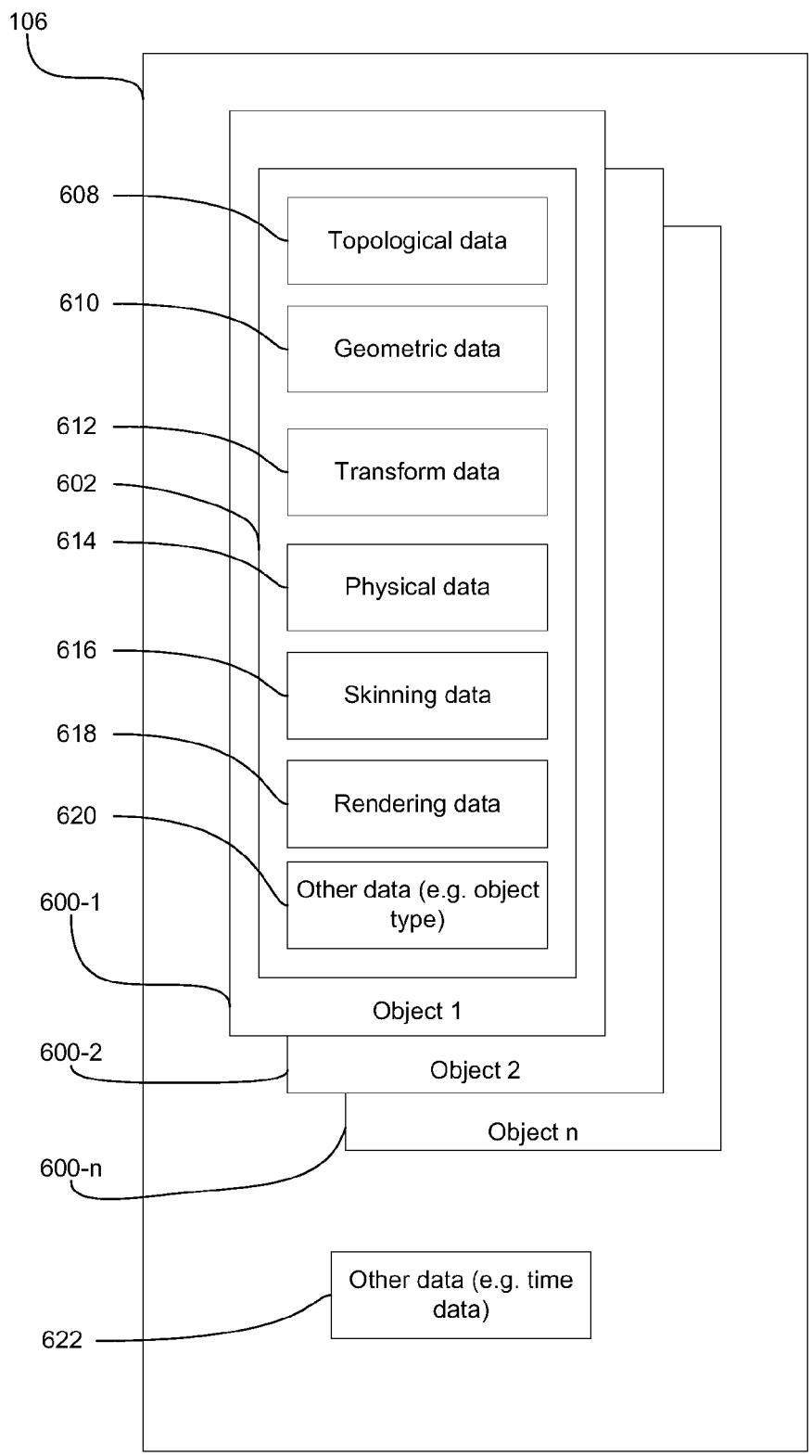
FIG. 6 schematically illustrates some of the data that may be stored in a memory of the computer system of FIG. 1 for embodiments of the invention.

FIG. 6 schematically illustrates some of the data that may therefore be stored in the memory 106 (or additionally or alternatively stored in the storage medium 104 or the data storage device 122, or which may be accessible via the network interface 116). There may be respective data 600 for one or more objects 200—in FIG. 6, there are n objects 200, each with their own data 600-1, 600-2, . . . , 600-n. The data 600 for an object 200 may include a set 602 of attribute data for that object 200, including one or more of: topological data 608; geometric data 610; trajectory data 612; physical data 614; skinning data 616; rendering data 618; and other data 620 specific to that object (e.g. a type of the object 200). There may also be stored other data 622 (such as data defining a time within a computer game or a movie; data defining or describing the virtual world 202; etc.) which is not specific to any one particular object 200.

3—Control for Object Parts

Embodiments of the invention involve applying control to an object part (joint or bone) of a virtual object 200 in the virtual world 202 so as to determine and/or cause movement of that object part within the virtual world 202, thereby generating an animation of the virtual object 200. This is described in detail below with reference to FIGS. 7A and 7B. As mentioned above, the object part shall be considered to be a joint of the virtual object 200, but the description below applies equally to applying control to a bone of the virtual object 200.

Figure 7A:
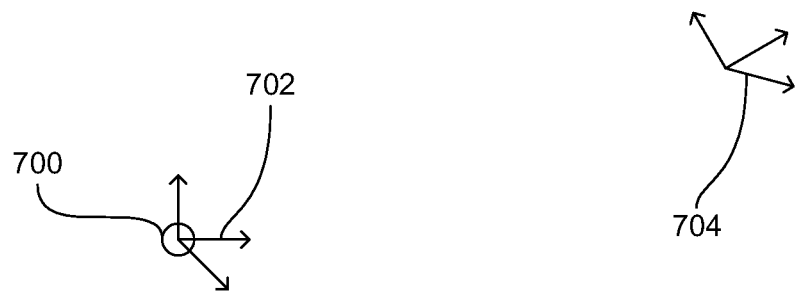
FIGS. 7A and 7B schematically illustrate a control frame and a target frame for an object part.
Figure 7B:
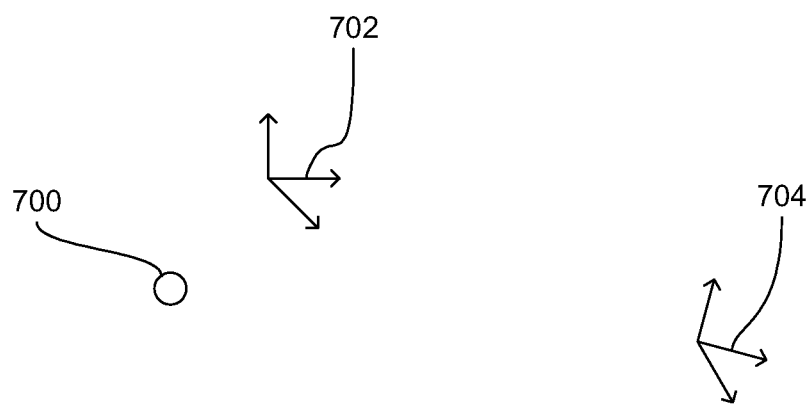

As shown in FIGS. 7A and 7B, a joint 700 has an associated frame 702 which shall be referred to as a "control frame" 702. Here, a "frame" defines a respective origin and set of axes. This may also be viewed as a "frame" defining a respective location and orientation at that location. The control frame 702 may be defined with respect to a "world" frame for the entire virtual world 202 (which may be predetermined, at least for a current time point, or may be fixed or not fixed). However, it will be appreciated that the control frame 702 may be defined with respect to a frame fixed at the joint 700 or with respect to any other frame. The control frame 702 is not necessarily fixed within the frame that it is defined with respect to. However, the control frame 702 is at a known (or specified) position and orientation in the virtual world 202 relative to the joint 700. This position and orientation may be predetermined or fixed relative to the joint 700, although this need not be the case and may change from one update time point to another update time point. As such, movement of the joint 700 within the virtual world 202 causes the control frame 702 to be updated so as to maintain its position and orientation in the virtual world 202 relative to the joint 700. The control frame 702 may be considered as "rigidly" linked/attached to the joint 700.

In FIG. 7A, the control frame 702 may have its respective origin/location coincident with the position of the joint 700 within the virtual world 202 (as specified by the geometric data for the object 200). The orientation of the control frame 702 may also be the same as the orientation of the joint 700 (as specified by the geometric data for the object 200), but this need not be the case. As shown in FIG. 7B, the respective origin/location of the control frame 702 may be different from the position of the joint 700 within the virtual world 202 (as specified by the geometric data for the object 200).

Animation of the object 200 comprises specifying a frame 704 in the virtual world 202 for the joint 700, which shall be referred to as a "target frame" 704 for the joint 700. Again, a "frame" defines a respective origin and set of axes, and this may also be viewed as a "frame" defining a respective location and orientation at that location. Again, the target frame 704 may be defined with respect to a predetermined frame, which may be a "world" frame for the entire virtual world 202 (which may be predetermined, at least for a current time point, or may be fixed or not fixed) or may be any other frame such as a frame fixed at the joint 700. Animation of the object 200 then comprises applying control to the joint 700, wherein the control is arranged such that the application of the control in isolation to the joint 700 would cause a movement of the joint 700 in the virtual world 202 that reduces the difference between the control frame 702 and the target frame 704. Here, the "difference" between the control frame 702 and the target frame 704 includes one or both of the distance between the respective origins/locations defined by the control frame 702 and the target frame 704 and the difference between the respective orientations of the control frame 702 and the target frame 704. Thus, reducing the difference between the control frame 702 and the target frame 704 may involve one or both of: (a) reducing the distance between the respective origins/locations defined by the control frame 702 and the target frame 704; and (b) reducing the difference between the respective orientations of the control frame 702 and the target frame 704. The aim, then, of applying control to the joint 700 is to try to move the joint 700 within the virtual world 202 so that the control frame 702 substantially coincides with the target frame 704 (in terms of position and/or orientation).

The application of "control" to the joint 700 shall be described in more detail later. It will be appreciated that the joint 700 may be connected to one or more other joints 700 (either directly or indirectly) to which control is also being applied. As discussed above, the movement of one joint may affect the position and orientation of another joint (e.g. the movement of a parent joint affects the position and orientation of a child joint). Hence, the application of the control to the joint 700 is such that, the control when applied "in isolation" to the joint 700 would cause a movement of the joint 700 in the virtual world 202 that reduces the difference between the control frame 702 and the target frame 704—however, the overall result of control being applied to multiple joints of the object 200 may have a different result, i.e. multiple controls being applied to multiple respective object parts may result in a different effect for a particular object part than would have resulted from the application of just that particular object part's control. Additionally, other influences may affect the movement, position and orientation of the joint 700. Such other influences could be, for example, the actual model being used within the virtual world 202 for the virtual object 200 (such as the simulation of gravity acting on the joint 700), the application of one or more other virtual wrenches to/on the virtual object 200, and/or a collision of the joint 700 or the virtual object 200 with another virtual object 200 within the virtual world 202. However, the intention is that, in the absence of other control being applied to the other joints of the object 200 and in the absence of other influences affecting the movement, position and orientation of the joint 700, the application of the specific control to the joint 700 would cause a movement of the joint 700 in the virtual world 202 that reduces the difference between the control frame 702 and the target frame 704.

4—Program Structure, Data Flow and Processing Flow

Figure 8:
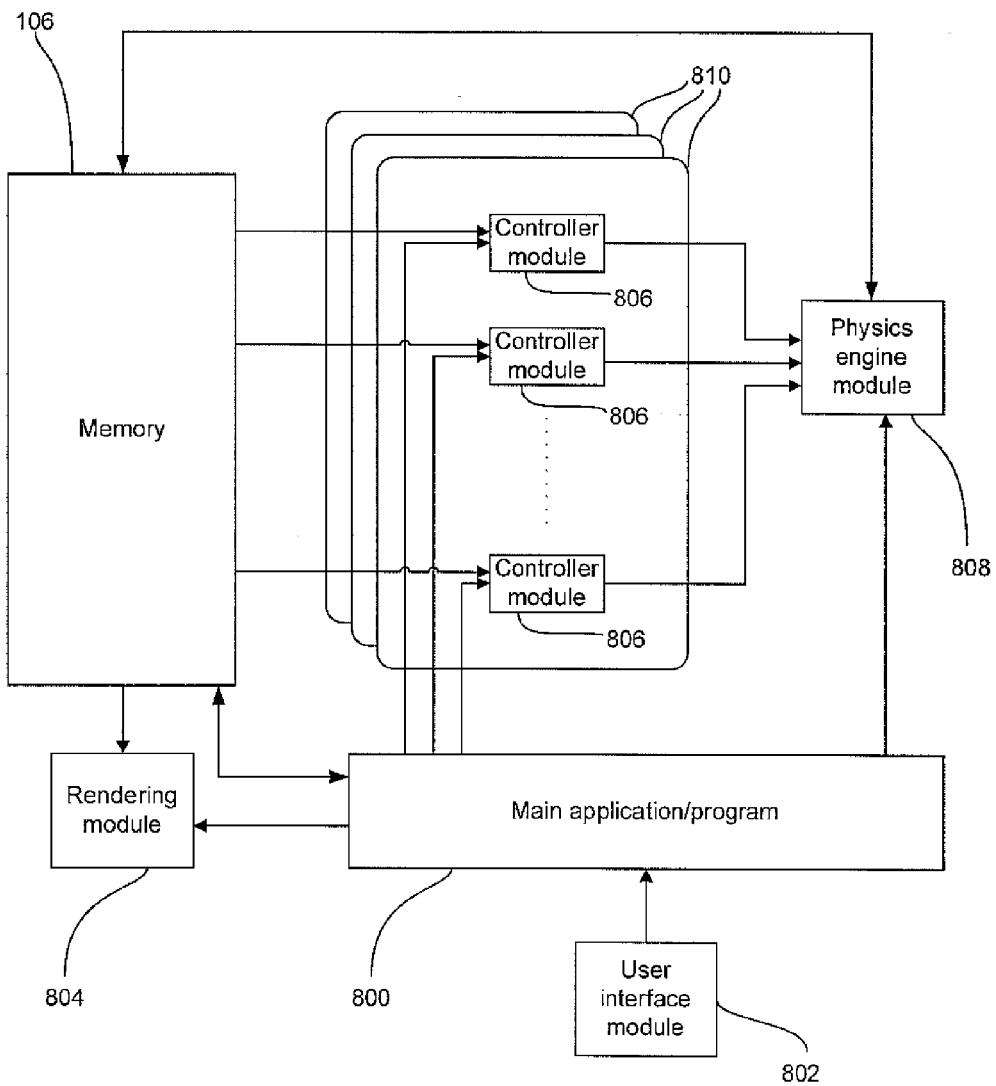
FIG. 8 schematically illustrates some of the software (computer program) modules used in an embodiment of the invention.

FIG. 8 schematically illustrates some of the software (computer program) modules used in an embodiment of the invention. These software modules are executed by the processor 108 of the computer 102. The software modules include: a main program/application 800; a user interface module 802; a rendering module 804; one or more controller modules 806; and a physics engine module 808. Some of these software modules may read and make use of the respective data 600 stored in the memory 106 for the one or more objects 200 in the virtual world 202. Some of these modules may write/update the respective data 600 stored in the memory 106 for the one or more objects 200 in the virtual world 202. This shall be described below in more detail below.

The main program/application 800 is responsible for the overall control of the processing to be performed. This purpose of this processing may be, for example, to provide a computer game, to generate an animation (for a movie/film), to simulate the movement of an object 200 under certain test conditions, or to provide any other functionality which involves (amongst other things) the animation of a virtual object 200 within a virtual world 202.

The main program 800 may require input from a human operator/user of the computer system 100. For example, when the processing of the main program 800 provides a computer game, then the game may involve the player controlling the movement of a character (or object 200) around a virtual world 202 by providing input (such as "move forwards/backwards" commands, "move left/right" commands", "jump/crouch" commands, etc.). When the processing of the main program 800 generates an animation (for a movie/film), then the main program 800 may require input from an operator specifying the particular movement of an object 200 within a virtual world 202 at one or more frames/fields of the movie/film. The user interface module 802 is arranged to detect inputs received from a user via the user input interface 114 of the computer 102 (e.g. inputs provided by the user using the keyboard 124 and/or the mouse 126 or other input device coupled to the computer 102). The user interface module 802 passes the detected input to the main program 800 so that the main program 800 can respond accordingly, i.e. generate the animation of a virtual object 200 in the virtual world 202 based on the received input.

The rendering module 804 outputs a visual representation of the virtual world 202 (or a part thereof), via the user output interface 112, for display on the monitor 120. For this, the rendering module 804 may use, amongst other things, some of the respective data 600 stored in the memory 106 for the one or more objects 200 in the virtual world 202 (as has been described above). The rendering module 804 may receive periodic instructions/commands from the main program 800 instructing the rendering module 804 to output an updated visual representation of the virtual world 202—such commands may be issued by the main program 800, for example, at an output video frame/field rate. Alternatively, the rendering module 804 may make use of its own timing mechanism, independent of the main program 800, and output an updated visual representation of the virtual world 202 at the output video frame/field rate.

It will be appreciated that some embodiments of the invention may omit the user interface module 802, for example when the control of the animation of an object 200 in the virtual world 202 is predetermined (e.g. based on a configuration file stored on the storage medium 104) and not requiring explicit user input. It will also be appreciated that some embodiments of the invention may omit the rendering module 804, for example when a visual output is not required but, instead, all that is required is that data representing the animation of an object 200 in the virtual world 202 is generated (and may be stored on the storage medium 104).

For each object 200 in the virtual world, there may be an associated set 810 of one or more controller modules 806. Each controller module 806 is associated with a corresponding object part (joint or bone) of the corresponding object 200. Again, the description below shall use joints as the example object parts and shall refer to FIGS. 7A and 7B, but as with FIGS. 7A and 7B the description applies equally to bones as the example object parts.

For a controller module 806, the associated joint 700 has a corresponding control frame 702, which may be defined by data stored as part of the object data 600 for the object 200 in the memory 106. The main program 800 determines a target frame 704 for the associated joint 700. This determination may be based, for example, on data from an animation configuration file stored on the storage medium 104 or on user input received via the user interface module 802. The main program 800 provides the controller module 806 with data defining the target frame 704. The controller module 806 may then ascertain the control frame 702 from the memory 106 and then the controller module 806 may determine a virtual wrench to be applied to the joint 700 based on the target frame 704 and the control frame 702 (and possibly other data too), wherein the virtual wrench, if applied in isolation to the joint 700, would cause a movement of the joint 700 in the virtual world 202 that reduces the difference between the control frame 702 and the target frame 704. By "virtual wrench" is meant a virtual force, a virtual torque, or a combined virtual force and virtual torque. This may also be referred to as an "action". Hence, the "control" referred to above when describing FIGS. 7A and 7B that is applied to the joint 700 may be a virtual wrench comprising a virtual force and/or virtual torque. The controller module 806 may compute the desired virtual wrench in a variety of ways as is well known in this field of technology and which shall therefore not be described in detail herein. The "control" applied in this manner (i.e. by explicitly calculating a virtual torque for application to an object part) shall be referred to "explicit control".

The physics engine module 808 is a well-known software module whose functioning shall not be described in detail herein. The physics engine module 808 is responsible for simulating physical laws and/or physical relationships and/or physical properties (such as fluid dynamics, Newtonian mechanics, etc.). The physics engine module 808 is therefore arranged to receive the virtual wrenches calculated by the one or more controllers 806. The physics engine module 808 is also arranged to read the various data from the memory 106. The physics engine module 808 may also receive further input from the main program 800. Based on the various inputs to the physics engine module 808 and the various data read by the physics engine module 808, the physics engine module 808 simulates the application of the laws of physics to the virtual object(s) 200, such as simulating the application of the respective virtual wrenches that have been calculated by the controller modules 806, subject to the physical properties of the various object parts of the virtual object(s) 200 (e.g. mass, inertia, current speed and acceleration, and any constraints on the relative movement of the object parts, such as a joint being a ball-and-socket joint or a hinge joint). As mentioned, this functionality of the physics engine module 808 is well-known and shall therefore not be described in more detail herein.

The physics engine module 808 may, in some embodiments, also be responsible for applying "control" to an object part 700 (as described with reference to FIGS. 7A and 7B above) so as to move the control frame 702 for that object part such that the difference between the control frame 702 and a target frame 704 for that object part 700 is reduced. Again, this is described below with reference to joints as the object parts 700, but the description applies equally to when the object parts 700 are bones.

For a particular joint 700, the main program 800 may provide the physics engine module 808 with data describing a target frame 704 for that joint 700. The physics engine module 808 may also read data representing the current control frame 702 for that joint 700 from the memory 106. The physics engine module 808 may simulate a connection or link between the control frame 702 and the target frame 704, the connection having a resilience (or elasticity or degree of stiffness) that aims to draw the control frame 702 towards the target frame 704 so as to align the control frame 702 with the target frame 704 in terms of position and orientation. This resilience may be linear or non-linear and may include one or more components/factors such as an elasticity component, a stiffness component, a viscous or damping component, etc. The terms "resilience" and "elasticity" as used throughout this specification shall be taken to include any such combination of one or more such components/factors. The origin of the control frame 702 may be at one end of this connection and the origin of the target frame 704 may be at the other end of this connection. This connection may be thought of as a spring (or a rubber rod) under tension. The degree of resilience (or elasticity) of the connection may vary from joint 700 to joint 700—the particular degree of resilience for the connection of the current joint 700 may be a predetermined value stored in the memory 106 as part of the object data 600 (e.g. as physical data 614) and may be read by the physics engine module 808; additionally or alternatively, the degree of resilience may vary over time. The physics engine module 808, in simulating the laws of physics and applying them to the virtual object 200, may therefore simulate this connection between the control frame 702 and the target frame 704 for the joint 700. The simulation of the connection and its resilience moves the control frame 702 within the virtual world 202, thereby moving the joint 700 correspondingly. The simulation of the connection and its resilience may also move the target frame 704 within the virtual world 202. In other words, the simulated resilience of the connection causes the physics engine module 808 to reduce difference between the control frame 702 and the target frame 704. It will be appreciated, therefore, that the application of "control" (as referred to with respect to FIGS. 7A and 7B) need not necessarily involve explicitly calculating a virtual wrench for application to a joint 700. Hence, the "control" applied in this manner shall be referred to "implicit control".

Figure 9:
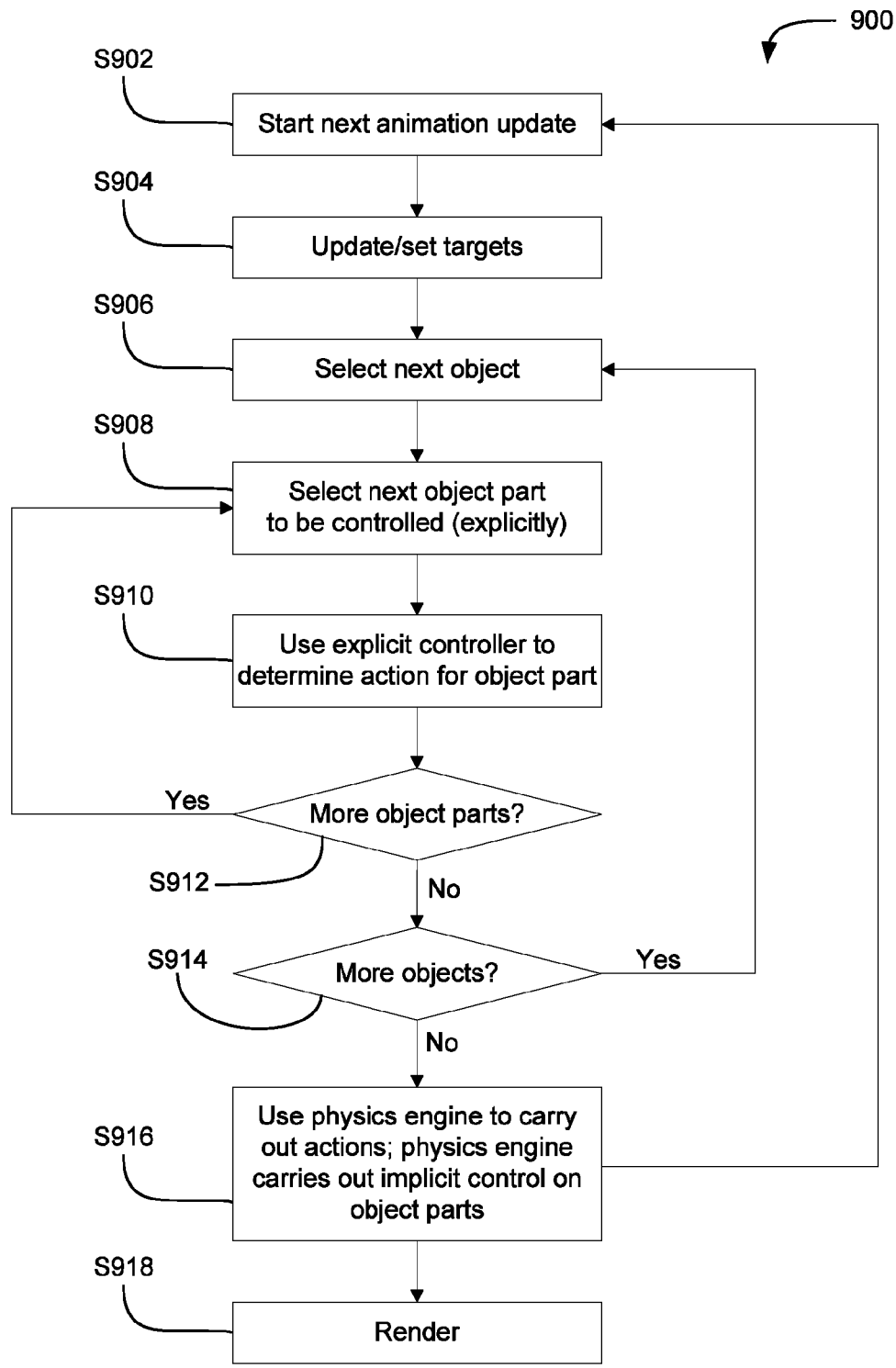
FIG. 9 is a flowchart schematically illustrating an animation update step.

As mentioned above, the animation of a virtual object 200 within a virtual world 202 comprises performing, at each update time point of a series of update time points, an update that updates values for (or assigned to) the object attributes for that virtual object 200. In other words, at each update time point during an animation of an object 200, an update process (or procedure or animation update step) is carried out that updates (i.e. sets) the object attributes for the object 200 according to values that the update process determines for those attributes. Each virtual object 200 within the virtual world 202 may undergo its own update process for each update time point (although there may also be a coordination of the update processes for two or more of the objects 200). FIG. 9 is a flowchart schematically illustrating the animation update step 900 performed for the objects 200 within the virtual world 202 at a update time point.

At a step S902, the animation update step 900 begins.

At a step S904, for one or more object parts of the one or more objects 200 within the virtual world 202 to which control is to be applied, respective target frames 704 are determined. In other words, for each object part to which control is to be applied, the target position and orientation for that object part is determined. This may be performed by the main program 800. The main program 800 may use input received from a user (e.g. a player of a computer game when the main program 800 is configured to provide a computer game) via the user interface module 802. The main program 800 may use one or more animation configuration files which specify a desired animation for the object 200 and from which the main program 800 may determined (i.e. read and/or calculate) the target frames 704.

At a step S906, a first object 200 is selected.

At a step S908, the first object part of that selected object 200 to which explicit control is to be applied by a controller module 806 is selected.

At a step S910, a controller module 806 is used to calculate an action/control (i.e. a virtual wrench) for application to the selected object part. The controller module 806 reads from the object data 600 stored in the memory 106 data that represents the current control frame 702 for that object part. The controller module 806 receives, from the main program 800, data representing the target frame 704 that has been determined for that object part. The controller module 806 uses the target frame 704 and the current control frame 702 to calculate a virtual wrench to be applied to the object part (as has been described above).

At a step S912, a check is made to see if, for the current object 200, there are more object parts to which explicit control is to be applied. If there are, then processing returns to the step S908 at which a next object part to which explicit control is to be applied is selected. Otherwise, processing continues at a step S914 at which a check is made to see if there are any more objects 200 in the virtual world 202 whose animation involves the application of explicit control. If there are, then processing returns to the step S906 at which the next object 200 whose animation involves the application of explicit control is selected. Otherwise, processing continues at a step S916.

At the step S916, the physics engine module 808 simulates the application of the laws of physics to the objects 200 within the virtual world 202. For this, the physics engine module 808 reads the various object data 600 from the memory 106. The physics engine module 808 also receives the various virtual wrenches that have been calculated by the respective controller modules 806 during this animation update step so that the physics engine module 808 can simulate the application of those virtual wrenches to the respective object parts. The physics engine module 808 also receives, from the main program 800, data representing the target frames 704 for each of the object parts to which implicit control is to be applied. As described above, for each object part to which implicit control is to be applied, the physics engine module 808 may simulate a respective resilient connection between the current control frame 702 for that object part and the received target frame 704 for that object part. The physics engine module 808 then applies its simulated laws of physics to the virtual objects 200 and their object parts—this includes applying the virtual wrenches calculated by the controller modules 806 to thereby move their respective object parts and simulating the resilient connections for the object parts to which implicit control is to be applied to thereby move those object parts. The physics engine module 808 then updates the object data 600 stored in the memory 106 accordingly. Processing then returns to the step S902 in order to carry out the processing for the next animation update step.

Additionally, processing may (independently, e.g. as a parallel process/task) continue at a step S918, at which the rendering module 804 may output a visual representation of the virtual world 202 (or a part thereof), via the user output interface 112, for display on the monitor 120. This visual representation is based on the updated object data 600 stored in the memory 106. As mentioned above, the step S918 is optional. As mentioned above, the frequency of actually rendering a representation of the virtual world 202 may be dependent on, or may be independent of, the frequency of the animation update time points. Thus, the step S918 may occur at any time independent of when the steps S902-916 are being performed and may occur less or more frequently than the step S902-916.

It will be appreciated that "control" may be applied to an object part in ways other than described above (i.e. other than the application of explicit control by a controller module 806 or the application of implicit control by the physics engine module 808). It will also be appreciated that, in some embodiments, control is applied only by controller modules 806 applying explicit control to object parts, i.e. the physics engine module 808 is not used to apply implicit control—FIGS. 8 and 9 would then be modified accordingly. It will also be appreciated that, in some embodiments, control is applied only by the physics engine module 808 applying implicit control to object parts, i.e. the controller modules 806 are not present and are not used to apply explicit control—FIGS. 8 and 9 would then be modified accordingly. Embodiments of the invention shall therefore be described below by using both explicit control and implicit control as example methods of how to apply control to an object part. However, this should not be taken as limiting embodiments of the invention—some embodiments may make use of explicit control, some embodiments may make use of implicit control and other embodiments may apply control to an object part by other techniques.

5—Control Modification 1

In one embodiment of the invention, at the animation update step (as described, for example, with reference to FIG. 9), control is applied (as explicit control, implicit control, or otherwise) to a first object part of the plurality of object parts that form the virtual object 200 as described below. The control is arranged such that the application of the control in isolation to the first object part would cause a movement of the first object part in the virtual world that (a) reduces the difference between the control frame 702 and the target frame 704 (as described above with reference to FIG. 7) and that also (b) has a substantially non-zero component along at most one or more degrees of freedom identified for the first object part. In other words, feature (b) means that the application of this specific control to the first object part is constrained such that that particular control itself can only cause a motion of the first object part having substantially non-zero components along only the specified degrees of freedom. This is not to say that other control applied to other object parts (which may even include the first object part again) might not induce a movement of the first object part having a non-zero component in a different direction. Additionally, this is not to say that the first object part is not allowed to move in a direction other than the specified degrees of freedom—it is simply that the application of this control to the first object part (on its own) cannot induce a movement of the first object part in a direction other than the specified degrees of freedom. In particular, it is possible that other factors or influences may affect the movement of the first object part and induce a movement of the first object part that is not constrained by the specified degrees of freedom in line with feature (b), such as the overall physical model (e.g. including gravity) that is being used to simulate the virtual object 200, or a collision of the first object part with another virtual object 200. This is explained in more detail below.

However, we note that "feature (b)" above could be replaced by "feature (b')", namely that: the movement has a substantially zero component along each of one or more degrees of freedom identified for the first object part. In other words, feature (b') means that the application of this specific control to the first object part is constrained such that that particular control itself can only cause a motion of the first object part having a substantially zero component along each of the specified degrees of freedom. This is not to say that other control applied to other object parts (which may even include the first object part again) might not induce a movement of the first object part having a non-zero component along a specified degree of freedom. Additionally, this is not to say that the first object part is not allowed to move along a specified degree of freedom—it is simply that the application of this control to the first object part (on its own) cannot induce a movement of the first object part along any of the specified degrees of freedom. In particular, it is possible that other factors or influences may affect the movement of the first object part and induce a movement of the first object part that is not constrained by the specified degrees of freedom in line with feature (b'), such as the overall physical model (e.g. including gravity) that is being used to simulate the virtual object 200, or a collision of the first object part with another virtual object 200.

As mentioned, for each of one or more of the object parts that are controlled of the virtual object 200, there may be one or more respective degrees of freedom that have been specified, defined, or identified in association with that object part. For example, the other data 620 of the object data 600 for the virtual object 20 may include data specifying, for each of those one or more object parts, the one or more respective degrees of freedom.

A "degree of freedom" may be a translational degree of freedom for the object part, which may be represented in the object data 600 as data defining a direction of a vector within the virtual world 202, or within a local coordinate system for the virtual object 200 or for the object part, or within any other coordinate system.

In embodiments that make use of feature (b') above (as opposed to feature (b) above), such a translational degree of freedom represents a direction in which the object part may not be translated by the application of control to that object part (i.e. the object part may not undergo any substantial translation in that direction as a result of the control being applied to that object part in isolation). One way to achieve this, when using explicit control, may be to ensure that the force generated/calculated for this control for application to the first object part has substantially zero components along the/each specified translational degree of freedom. Similarly, when using implicit control, the connection that is simulated for this control for the first object part may be constrained so that it cannot translate the first object part along, or cannot induce a force on the first object part having a substantially non-zero component along, any of the specified translational degrees of freedom. This is described in more detail later.

In embodiments that make use of feature (b) above (as opposed to feature (b') above), the/each specified translational degree of freedom represents those directions in which the object part may be translated by the application of control to that object part (i.e. the object part may undergo substantial translation only in the/those directions as a result of the control being applied to that object part in isolation). One way to achieve this, when using explicit control, may be to ensure that the force generated/calculated for this control for application to the first object part has substantially non-zero components only along the/each specified translational degree of freedom. Similarly, when using implicit control, the connection that is simulated for this control for the first object part may be constrained so that it can only translate the first object part along, or can only induce a force on the first object part having a substantially non-zero component along at most, the specified translational degrees of freedom. This is described in more detail later.

Alternatively, a "degree of freedom" may be a rotational degree of freedom for the object part, which may be represented in the object data 600 as data defining an axis of rotation within the virtual world 202, or within a local coordinate system for the virtual object 200 or for the object part, or within any other coordinate system.

In embodiments that make use of feature (b') above (as opposed to feature (b) above), such a rotational degree of freedom represents a direction in which the object part may not be rotated by the application of control to that object part (i.e. the object part may not undergo any substantial rotation about the specified axis as a result of the control being applied to that object part in isolation). One way to achieve this, when using explicit control, may be to ensure that the torque (or the axis thereof) generated/calculated for this control for application to the first object part has substantially zero components along the/each specified rotational degree of freedom. Similarly, when using implicit control, the connection that is simulated for this control for the first object part may be constrained so that it cannot rotate the first object part about an axis having a component along, or cannot induce a torque on the first object part having an axis with a substantially non-zero component along, any of the specified rotational degrees of freedom. This is described in more detail later.

In embodiments that make use of feature (b) above (as opposed to feature (b') above), the/each specified rotational degree of freedom represents those directions in which the object part may be rotated by the application of control to that object part (i.e. the object part may undergo substantial rotation only about the/each specified axes as a result of the control being applied to that object part in isolation). One way to achieve this, when using explicit control, may be to ensure that the torque (or the axis thereof) generated/calculated for this control for application to the first object part has substantially non-zero components along only the/each specified rotational degree of freedom. Similarly, when using implicit control, the connection that is simulated for this control for the first object part may be constrained so that it can only rotate the first object part about an axis having a non-zero component only along, or can only induce a torque on the first object part having an axis with a substantially non-zero component only along, any of the specified rotational degrees of freedom. This is described in more detail later.

The one or more degrees of freedom specified for an object part may include zero or more rotational degrees of freedom and/or zero or more translational degrees of freedom. The one or more degrees of freedom specify limits (or constraints or guides) on how the control generated and applied to an object part may move that object part, i.e. they help specify which movements are and are not permitted. In embodiments making use of feature (b'), it is not permitted to generate (via the application of this specific control) a movement of the object part that has a substantially non-zero translational component along one of the specified translational degrees of freedom by application of the control in isolation to the object part— similarly, it is not permitted to generate (via the application of this specific control) a movement of the object part that has a substantially non-zero rotational component along one of the specified rotational degrees of freedom by application of the control in isolation to the object part. In other words, it is only permitted to generate a movement of the object part that has a substantially zero component along each of the specified degrees of freedom by application of the control in isolation to the object part. In embodiments making use of feature (b), it is not permitted to generate (via the application of this specific control) a movement of the object part that has a substantially non-zero translational component along a translational degree of freedom orthogonal to the/any specified translational degree(s) of freedom by application of the control in isolation to the object part—similarly, it is not permitted to generate (via the application of this specific control) a movement of the object part that has a substantially non-zero rotational component along a rotational degree of freedom orthogonal to the/any specified rotational degree(s) of freedom by application of the control in isolation to the object part. In other words, it is only permitted to generate a movement of the object part that has a substantially zero component along any rotational/rotational degree of freedom orthogonal to the specified rotational/translational degrees by application of the control in isolation to the object part.

It will be appreciated that embodiments of the invention may make use of feature (b) and/or feature (b') to specify degrees of freedom along which movement (rotation or translation) is or is not allowed.

The translational degrees of freedom that are specified for an object part need not necessarily be mutually orthogonal. However, the skilled person will readily appreciate that any set of one or more translational degrees of freedom may be represented by an orthogonal basis of translational degrees of freedom. For example, two non-orthogonal translational degrees of freedom will specify a plane in which translation of the object part may/may-not be allowed—this plane may equally be specified by two orthogonal translational degrees of freedom. It will therefore be assumed in the following that any translational degrees of freedom specified for an object part are indeed mutually orthogonal. The skilled person will appreciate that if the specified translational degrees of freedom are not mutually orthogonal then an equivalent set of orthogonal translational degrees of freedom for use instead may be determined or calculated (e.g. by the main program 800, a controller module 806 or the physics engine module 808)—this will have the same end effect as using the non-orthogonal degrees of freedom. As will be described in more detail later, embodiments of the invention may therefore make use of a "translation frame", which is another frame associated with the object part (like the control frame 702 and the target frame 704), where any specified translational degrees of freedom form corresponding axes for the translation frame (i.e. the specified translational degrees of freedom form canonical axes for the translation frame).

Similarly, the rotational degrees of freedom that are specified for an object part need not necessarily be mutually orthogonal but as any set of one or more rotational degrees of freedom may be represented by an orthogonal basis of rotational degrees of freedom it will be assumed in the following that any rotational degrees of freedom specified for an object part are indeed mutually orthogonal. The skilled person will appreciate that if the specified rotational degrees of freedom are not mutually orthogonal then an equivalent set of orthogonal rotational degrees of freedom for use instead may be determined or calculated (e.g. by the main program 800, a controller module 806 or the physics engine module 808)—this will have the same end effect as using the non-orthogonal degrees of freedom. As will be described in more detail later, embodiments of the invention may therefore make use of a "rotation frame", which is another frame associated with the object part (like the control frame 702 and the target frame 704), where any specified rotational degrees of freedom form corresponding axes for the rotation frame (i.e. the specified rotational degrees of freedom form canonical axes for the rotation frame).

In general, the positions in the virtual world 202 of the origin of the rotation frame and the origin of the translation frame for an object part are not used—it is generally only the orientation of the rotation and translation frames that is used by embodiments of the invention. Hence, the rotation frame and the translation frame may have their respective origins located at any respective points in the virtual world 202.

FIGS. 10A, 10B, 10C, 10D and 10E illustrate some of the above. In these figures, the control frame 702 and the target frame 704 are shown as two-dimensional frames for ease of illustration, but it will be appreciated that the description below applies equally to three-dimensional frames.

Figure 10A:
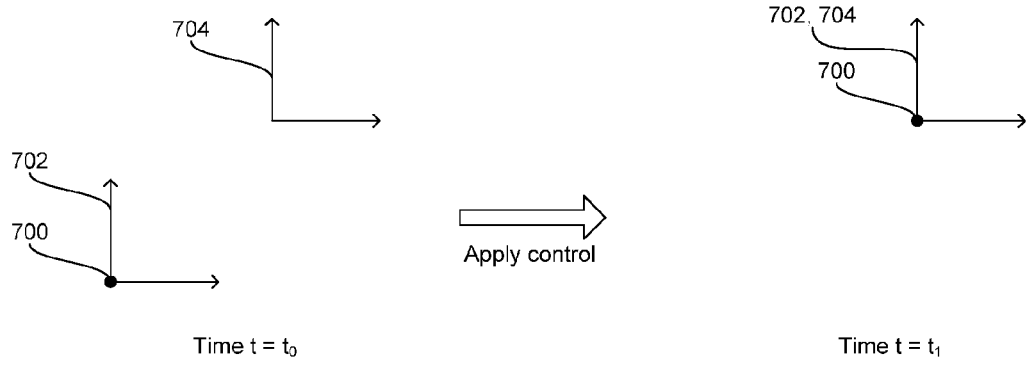
FIGS. 10A-E schematically illustrate the application of control to an object part according to one embodiment of the invention.

FIG. 10A illustrates the application of control to an object part 700 having a control frame 702 and a target frame 704 when this embodiment of the invention is not in use (i.e. when the control applied does not conform to feature (b) or (b') above). At a time $t_0$, the control frame 702 is not coincident with the target frame 704. However, the application of control to the object part 700 results in the control frame 702 becoming substantially aligned with the target frame 704 at some later time $t_1$ (which may involve one or more animation update steps).

Figure 10B:
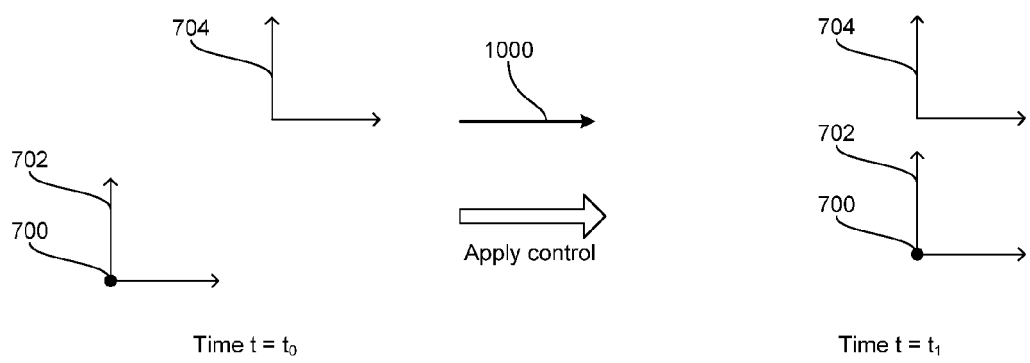

FIG. 10B illustrates the application of control to an object part 700 having a control frame 702 and a target frame 704 for embodiments that make use of feature (b). At a time $t_0$, the control frame 702 is not coincident with the target frame 704. The application of control to the object part 700 results in a reduction in the difference between the control frame 702 and the target frame 704 at some later time $t_1$ (which may involve one or more animation update steps). However, in FIG. 10B the only translational degree of freedom that has been specified is degree of freedom 1000 and therefore substantial translational movement of the object part 700 orthogonal to that degree of freedom 1000 is not permitted. Thus, in this two-dimensional example, the object part 700 may only be translated in the direction 1000.

Figure 10C:
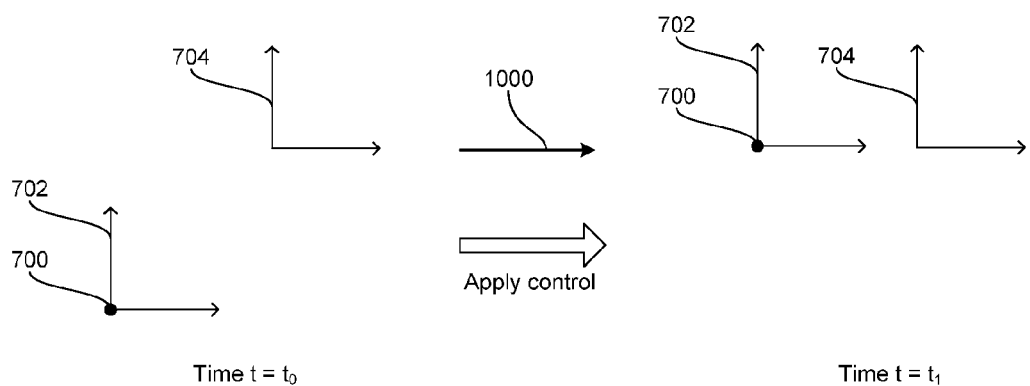

FIG. 10C illustrates the application of control to an object part 700 having a control frame 702 and a target frame 704 for embodiments that make use of feature (b'). At a time $t_0$, the control frame 702 is not coincident with the target frame 704. The application of control to the object part 700 results in a reduction in the difference between the control frame 702 and the target frame 704 at some later time $t_1$ (which may involve one or more animation update steps). However, in FIG. 10C the only translational degree of freedom that has been specified is degree of freedom 1000 and therefore substantial translational movement of the object part 700 along that degree of freedom 1000 is not permitted. Thus, in this two-dimensional example, the object part 700 may only be translated orthogonally to the direction 1000.

Figure 10D:
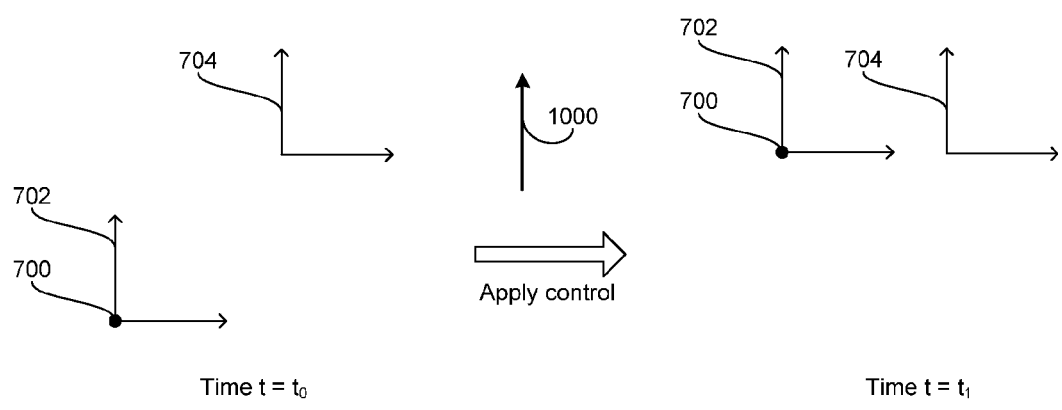
Figure 10E:
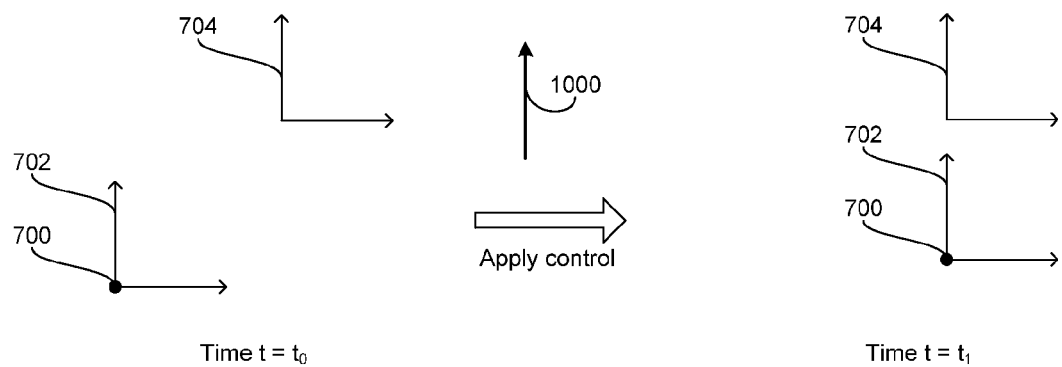

It will be clear that the use of feature (b) can be used to implement embodiments that use feature (b')—it only requires that different degrees of freedom are specified. For example, FIG. 10D illustrates the application of control to an object part 700 having a control frame 702 and a target frame 704 for embodiments that make use of feature (b). This is the same as FIG. 10B except that the specified translational degree of freedom 1000 in FIG. 10D is orthogonal to that specified in FIG. 10B. The resultant movement of the object part 700 is then the same as in FIG. 10C (which was an embodiment using feature (b') instead). Similarly, it will be clear that the use of feature (b') can be used to implement embodiments that use feature (b)—it only requires that different degrees of freedom are specified. For example, FIG. 10E illustrates the application of control to an object part 700 having a control frame 702 and a target frame 704 for embodiments that make use of feature (b'). This is the same as FIG. 10C except that the specified translational degree of freedom 1000 in FIG. 10E is orthogonal to that specified in FIG. 10C. The resultant movement of the object part 700 is then the same as in FIG. 10B (which was an embodiment using feature (b) instead). Therefore, the description below shall focus (for the main part) on the use of feature (b) to specify the particular degrees of freedom. However, it will be appreciated that the discussion below applies analogously to embodiments that make use of feature (b').

Below are described two methods for implementing the above embodiments of the invention.

5.1—Control Modification 1: Modification of the Target Frame

One way to implement the above-mentioned embodiment of the invention is to modify the target frame 704. The target frame 704 may be modified so that the movement of the object part 700 that results in a reduction in the difference between the control frame 702 and the now-modified target frame 704 causes a movement that conforms to feature (b) or feature (b') as appropriate. In particular, an embodiment that makes use of feature (b) may comprise, at the animation update step receiving data specifying a desired-target frame in the virtual world 202 and then specifying the actual target frame 704 as an approximation (or modification) of the desired-target frame, the approximation being such that movement of the object part 700 only along the one or more identified degrees of freedom is needed/required to make the control frame 702 coincide with the actual target frame 704. Similarly, an embodiment that makes use of feature (b') may comprise, at the animation update step receiving data specifying a desired-target frame in the virtual world 202 and then specifying the actual target frame 704 as an approximation (or modification) of the desired-target frame, the approximation being such that, for each of the one or more identified degrees of freedom, movement of the object part 700 along that degree of freedom is not required to make the control frame 702 coincide with the actual target frame 704. The approximation of the desired-target frame is preferable performed such that the actual target 704 is as close as possible to the desired-target frame whilst being constrained or restricted by the specified degrees of freedom (i.e. whilst still being able to conform to feature (b) or (b')).

Thus, the main program 800 may determine, or may be provided with, an initial/desired target frame for an object part 700. A new target frame 704 that is actually to be used instead of the desired target frame is then calculated. This new target frame 704 may be seen as a projection (or approximation) of the desired target frame based on the one or more degrees of freedom that have been identified. The determination of the actual new target frame 704 from the initial target frame may be performed by: (a) the main program 800 itself so that the modified target frame 704 is provided to the controller module 806 and/or the physics engine module 808; (b) the controller module 806 for the object part 700; or (c) the physics engine module 808. In any case, the generation of the new target frame 704 may involve reading data defining the specified degrees of freedom for the object part 700 and the control frame for the object part 700 from the memory 106, receiving or calculating data defining the desired target frame and then determining the new target frame 704 based on the specified degrees of freedom and the desired target frame. The determination of the new target frame 704 is described below.

Figure 11:
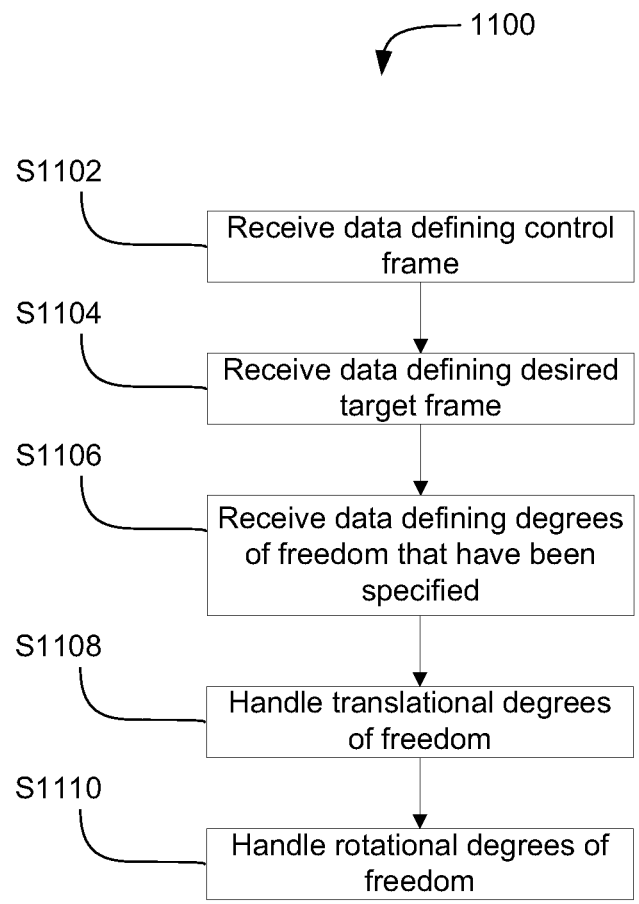
FIG. 11 is a flowchart schematically illustrating a method for determining a new target frame.

FIG. 11 is a flowchart schematically illustrating a method 1100 for determining the new target frame 704. As mentioned this method 1100 may be carried out by the main program 800 or a controller module 806. The actual software component that carries out the determination of the new target frame 704 shall be referred to as the "calculating module" in the following.

At a step S1102, the calculating module receives data defining the control frame 702 for the object part 700, for example by reading it from the object data 600 in the memory 106.

At a step S1104, the calculating module receives data defining the initially desired target frame for the object part 700, for example by reading it from the object data 600 in the memory 106 or receiving it from the main program 800.

At a step S1106, the calculating module receives data identifying the various rotational and/or translational degrees of freedom that have been specified for the object part 700, for example by reading it from the object data 600 in the memory 106.

At a step S1108, the calculating module handles, or takes account of the/any specified translational degrees of freedom (separately from the/any specified rotational degrees of freedom) in order to determine the location of the origin for the new target frame 704.

At a step S1110, the calculating module handles, or takes account of the/any specified rotational degrees of freedom (separately from the/any specified translational degrees of freedom) in order to determine the orientation of the new target frame 704.

Thus, the steps S1102, S1104 and S1106 represent the calculating module obtaining various data so that it can determine the new (updated) target frame 704. Whilst shown as separate steps in a particular order, the skilled person will appreciate that the steps S1102, S1104, S1106 may be performed in a different order or may be combined into fewer steps. Similarly, the steps S1108 and S1110 represent the calculating module determining the new (updated) target frame 704. Whilst shown as separate steps in a particular order, the skilled person will appreciate that the steps S1108 and S1110 may be performed in a different order or may be combined into a step.

Figure 12:
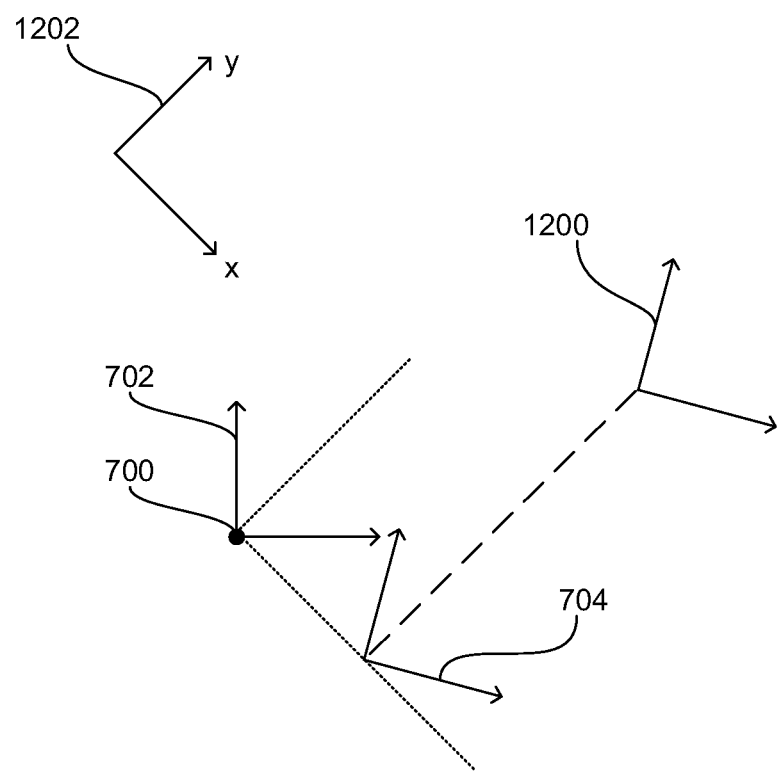
FIG. 12 schematically illustrates a method to calculate the origin of a new target frame according to an embodiment of the invention.

The step S1108 (i.e. determining the location of the origin for the new target frame 704) is described below with reference to FIG. 12. As shown in FIG. 12, for the current object part 700 there is: an associated control frame 702; an associated initial desired target frame 1200; an associated translation frame 1202; and an associated determined/updated target frame 704 (whose origin is to be determined at the step S1108). The frames shown in FIG. 12 are two-dimensional, but this is simply for ease of illustration and, as described below, embodiments of the invention apply to other dimensionality of the frames.

The control frame 702 may be defined by data of the object data 600 read from the memory 106.

The initial desired target frame 1200 may be defined by data generated by the main program 800.

The translation frame 1202 is a frame whose origin could be anywhere in the virtual world 202 but whose axes are such that each translational degree of freedom specified for the object part 700 (bearing in mind that there may be zero or more and that it is being assumed, as described above, that any translational degrees of freedom specified are mutually orthogonal) is parallel to one of the axes of the translation frame 1202. For example, if a single translational degree of freedom is specified, then the translation frame 1202 may have its x-axis in the direction of the specified translational degree of freedom and may have its y-axis (and z-axis) in any mutually orthogonal directions.

The dotted lines in FIG. 12 represent the translation frame 1202 repositioned so as to have its origin coincident with the origin of the control frame 702.

In the example shown in FIG. 12, a single translational degree of freedom has been specified with the intention that translation is not permitted along the y-axis (i.e. the translation of the object part 700 should have a substantially zero component in the y-direction). For embodiments making use of feature (b) above, this may have involved specifying, as the degrees of freedom for the object part 700, a direction parallel to the x-axis (and the z-axis too). For embodiments making use of feature (b') above, this may have involved specifying, as the degrees of freedom for the object part 700, a direction parallel to the y-axis.

The calculation of the origin of the target frame 704 therefore involves a projection (shown as a dashed line in FIG. 12) of the origin of the initial desired target frame 1200 based on the directions of the axes of the translation frame 1202 stretching out from the origin of the control frame 702 (these directions being the dotted lines in FIG. 12) and the property of whether or not translation along those directions is permitted. In summary, the directions in which translation may occur (as specified directly or indirectly by the/any specified translational degrees of freedom) generate a point, line, plane or volume containing the origin of the control frame 702 and containing the points in the virtual world 202 to which that origin may be translated—the origin of the target frame 704 is then the orthogonal projection of the origin of the initial desired target frame 1200 onto that point, line, plane or volume.

In particular, if the origin of the control frame 702 is at $(p_{1x}, p_{1y}, p_{1z})$ with respect to the translation frame 1202 and if the origin of the initial target frame 1200 is at $(p_{2x}, p_{2y}, p_{2z})$ with respect to the translation frame 1202, then the origin of the target frame 704 to actually be used is at $(p_{dx}, p_{dy}, p_{dz})$ with respect to the translation frame 1202 where:

(a) component $p_{dx}=p_{1x}$ if the motion generated by applying control to the object part 700 is not allowed to have a substantially non-zero component along the x-axis of the translation frame 1202; and component $p_{dx}=p_{2x}$ if the motion generated by applying control to the object part 700 is allowed to have a substantially non-zero component along the x-axis of the translation frame 1202;

(b) component $p_{dy}=p_{1y}$ if the motion generated by applying control to the object part 700 is not allowed to have a substantially non-zero component along the y-axis of the translation frame 1202; and component $p_{dy}=p_{2y}$ if the motion generated by applying control to the object part 700 is allowed to have a substantially non-zero component along the y-axis of the translation frame 1202; and (c) component $p_{dz}=p_{1z}$ if the motion generated by applying control to the object part 700 is not allowed to have a substantially non-zero component along the z-axis of the translation frame 1202; and component $p_{dz}=p_{2z}$ if the motion generated by applying control to the object part 700 is allowed to have a substantially non-zero component along the z-axis of the translation frame 1202.

The step S1110 (i.e. determining the orientation of the new target frame 704) is described below.

If the (or any) specified rotational degrees of freedom mean that rotation of the control frame 702 is permissible in any direction (i.e. for a three-dimensional virtual world 202, rotation about three orthogonal axes is allowed), then the orientation of the final target frame 704 is equal to the orientation of the initial desired target frame 1200.

If the (or any) specified rotational degrees of freedom mean that no rotation of the control frame 702 in any direction is permissible (i.e. for a three-dimensional virtual world 202, there is no direction about which rotation is allowed), then the orientation of the final target frame 704 is equal to the orientation of the control frame 702.

This leaves two other situations handled at the step S1110, namely (i) rotation of the control frame 702 is permissible about two orthogonal directions/axes and (ii) rotation of the control frame 702 is permissible about only one direction/axis. These are discussed below.

FIGS. 13A-13D schematically illustrate a method to calculate the orientation of the new target frame 704 when rotation of the control frame 702 is permissible about two orthogonal directions/axes.

Figure 13A:
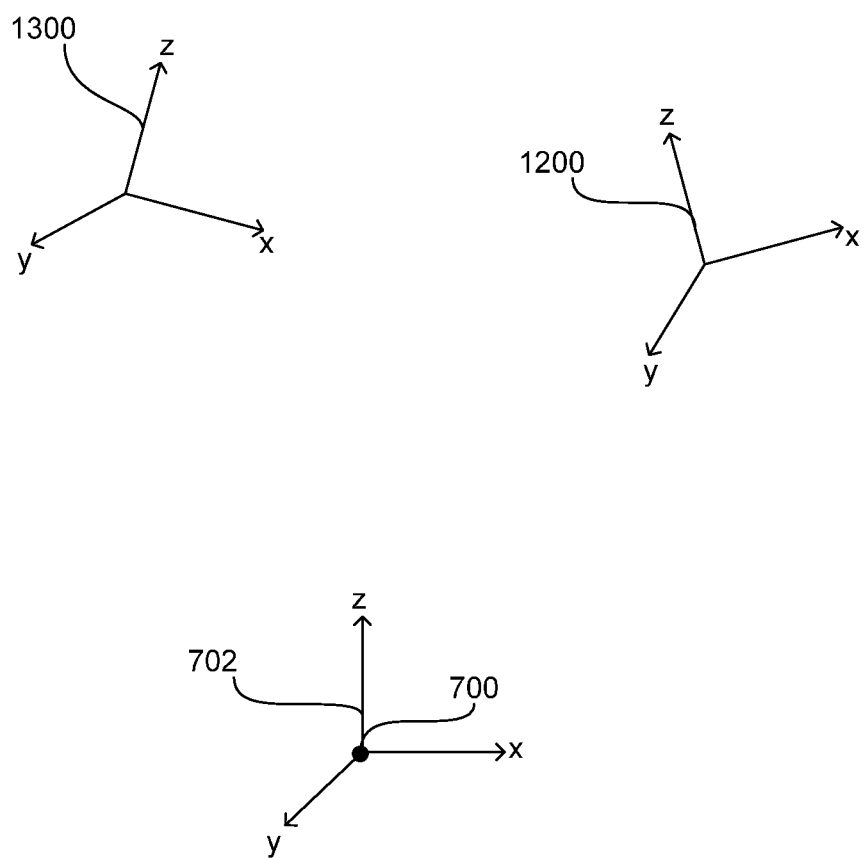
FIGS. 13A-13D schematically illustrate a method to calculate the orientation of a new target frame when rotation of a control frame is permissible about two orthogonal directions/axes according to an embodiment of the invention.

As shown in FIG. 13A, for the current object part 700 there is: an associated control frame 702; an associated initial target frame 1200; and an associated rotation frame 1300.

The control frame 702 may be defined by data of the object data 600 read from the memory 106.

The initial target frame 1200 may be defined by data generated by the main program 800 or as an output of the step S1108 (which may output a first updated target frame by taking into account the/any specified translational degrees of freedom).

The rotation frame 1300 is a frame whose origin could be anywhere in the virtual world 202 but whose axes are such that each rotational degree of freedom specified for the object part 700 (bearing in mind that there may be zero or more and that it is being assumed, as described above, that any rotational degrees of freedom specified are mutually orthogonal) is parallel to one of the axes of the rotation frame 1300. For example, if a single rotational degree of freedom is specified, then the rotation frame 1300 may have its x-axis in the direction of the specified rotational degree of freedom and may have its y-axis and z-axis in any mutually orthogonal directions.

In the example shown in FIG. 13A, rotation of the control frame 702 about an axis parallel to the x-axis of the rotation frame 1300 is prohibited, i.e. rotation of the control frame 702 about an axis parallel to the y-axis or about an axis parallel to the z-axis is permitted. For embodiments making use of feature (b) above, this may have involved specifying, as the rotational degrees of freedom for the object part 700, the y-axis and the z-axis of the rotation frame 1300, these being orthogonal to the prohibited x-axis. For embodiments making use of feature (b') above, this may have involved specifying, as the rotational degrees of freedom for the object part 700, just the x-axis of the rotation frame 1300.

Figure 13B:
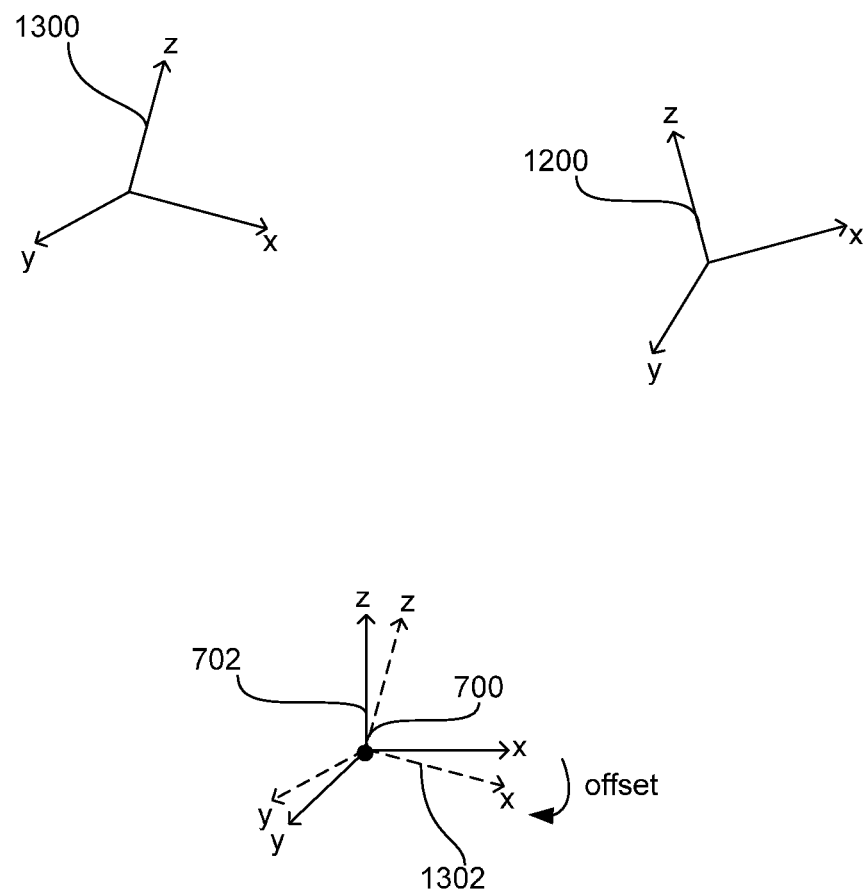

FIG. 13B is the same as FIG. 13A except that it also illustrates a first intermediate frame 1302. The first intermediate rotation frame 1302 is the same as the rotation frame 1300 in orientation—the origin for the first intermediate frame 1302 is at the origin for the control frame 702. The rotational offset between axes of the control frame 702 and corresponding axes of the first intermediate frame 1302 may be determined.

Figure 13C:
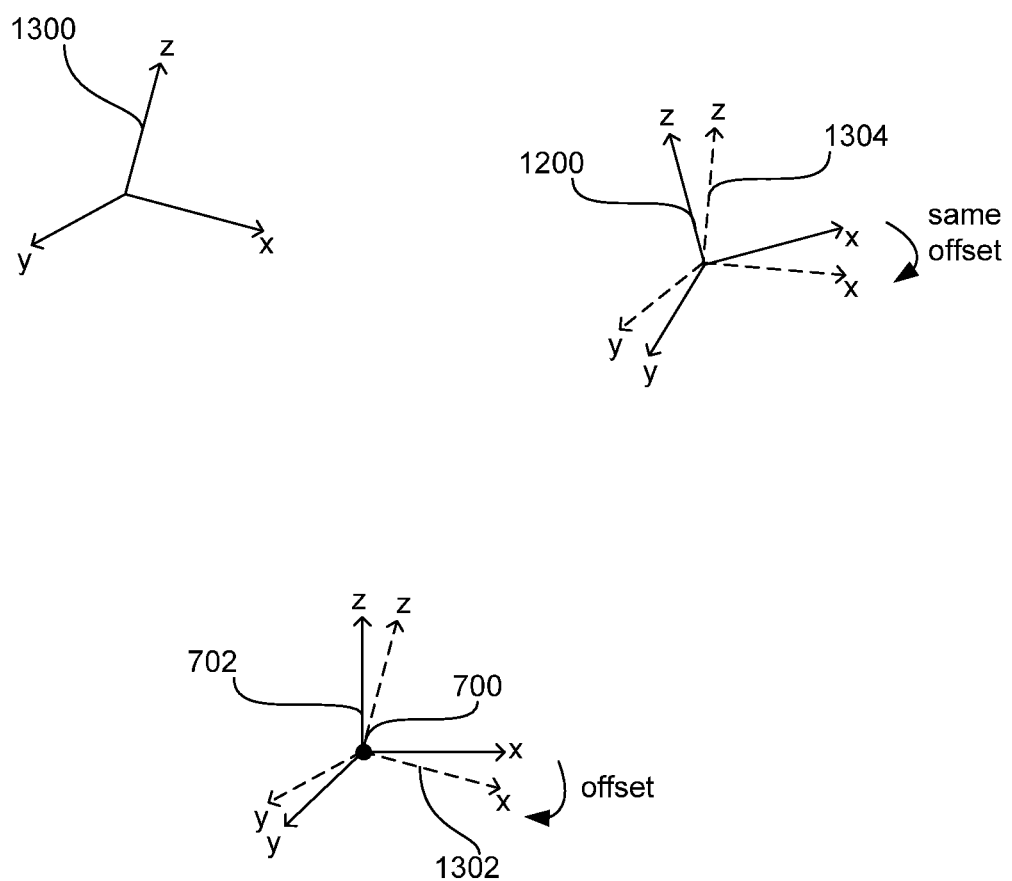

FIG. 13C is the same as FIG. 13B except that it also illustrates a second intermediate frame 1304. The second intermediate frame 1304 has the same origin as the initial desired target frame 1200—the orientation of the second intermediate frame 1304 is the orientation of the initial desired target frame 1200 with the offset determined in FIG. 13B applied.

Figure 13D:
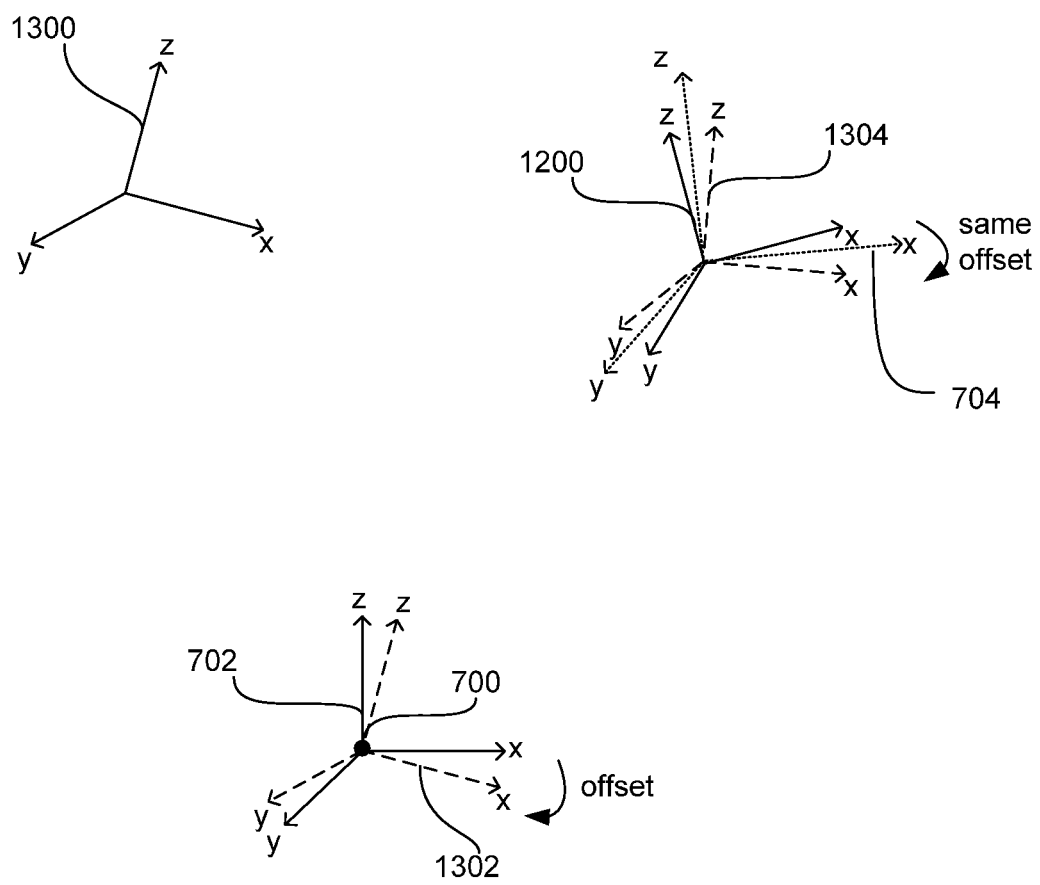

FIG. 13D is the same as FIG. 13C except that it also illustrates the new target frame 704. The orientation of the target frame 704 may be determined to be the orientation that the control frame 702 would have if the control frame 702 had applied to it the rotational geodesic which would take the x-axis of the first intermediate frame 1302 to the x-axis of the second intermediate frame 1304.

The determination of the orientation of the target frame 704 need not be carried out in such a step-by-step manner as described above with reference to FIGS. 13A-D. It will be appreciated that FIGS. 13A-D merely show a step-by-step determination of the orientation of the target frame 704 for ease of explanation. In particular, as the orientation of the target frame 704 may be obtained by the rotation of the control frame 702 around a vector r, the above description is equivalent to the following calculation:

$$^{rot}R_d = \exp([r])^{rot}R_1$$

where:

$^{rot}R_d$ is the rotation matrix that represents the orientation of the final target frame 704 with respect to (or viewed within the coordinate system of) the rotation frame 1300;

$^{rot}R_1$ is the rotation matrix that represents the orientation of the control frame 702 with respect to (or viewed within the coordinate system of) the rotation frame 1300;

$$r = \frac{x_{rot} \times x_{int2}}{\|x_{rot} \times x_{int2}\|} \arccos(x_{rot} \cdot x_{int2})$$

where $x_{rot}$ and $x_{int2}$ are vectors specifying the direction of the x-axis of the rotation frame 1300 and the second intermediate frame 1304 respectively (as expressed in the rotation frame 1300);

[r] is the screw matrix notation for vector r, where the screw matrix notation for a vector v=(a,b,c) is $$v = \begin{pmatrix} 0 & -c & b \\ c & 0 & -a \\ -b & a & 0 \end{pmatrix};$$

and exp([v]) represents, for a vector v, the rotation matrix having v as the axis of rotation and having an angle $\|v\|$.

It will be appreciated that the above calculation is based on rotation of the control frame 702 about the x-axis of the rotation frame 1300 being prohibited. The analogous calculation applies mutatis mutandis if, say, rotation of the control frame 702 about the y-axis or the z-axis of the rotation frame 1300 were prohibited instead.

Turning, then, to the calculation of the orientation of the target frame 704 when rotation of the control frame 702 is permissible about only one direction/axis. The control frame 702 may be rotated about a single axis through its origin, where this axis is defined (directly or indirectly) by the rotational degree(s) of freedom that have been specified for the object part 700. The orientation of the target frame 704 will therefore be the orientation of the control frame 702 when the control frame 702 has been rotated by some angle θ about this single axis of rotation. Determination of the angle θ may be based on the following.

The angle θ may be determined by finding a value θ that minimizes $\|{}^2R_d\|$ for some norm $\|\ \|$, where ${}^2R_d$ is the rotation matrix that represents the orientation of the final target frame 704 with respect to (or viewed within the coordinate system of) the initial desired target frame 1200. In other words, the determined value θ is the angle of rotation of the control frame 702 about the axis of rotation that would bring the control frame 702 closest to being the same (orientation-wise) as the initially specified target frame 1200.

Let ${}^{rot}R_d$ be the rotation matrix that represents the orientation of the final target frame 704 with respect to the rotation frame 1300 (as described above); let ${}^{rot}R_1$ be the rotation matrix that represents the orientation of the control frame 702 with respect to the rotation frame 1300 (as described above); and let ${}^{rot}R_2$ be the rotation matrix that represents the orientation of the initial desired target frame 1200 with respect to (or viewed within the coordinate system of) the rotation frame 1300. Then the following equation holds:

$$^{rot}R_d = \exp\left(\begin{bmatrix}\theta\\0\\0\end{bmatrix}\right){}^{rot}R_1$$

The minimization problem may then be solved by minimizing $$\left\|\log\left({}^{rot}R_2^T\exp\left(\begin{bmatrix}\theta\\0\\0\end{bmatrix}\right){}^{rot}R_1\right)\right\|$$

or minimizing the quadratic counterpart $$\frac{1}{2}\left\|\log\left({}^{rot}R_2^T\exp\left(\begin{bmatrix}\theta\\0\\0\end{bmatrix}\right){}^{rot}R_1\right)\right\|^2$$

where "log" is the inverse of the "exp" function defined above.

However, these two minimizations are highly non-linear due to the presence of the "log" and would therefore be computationally expensive to calculate.

Therefore the minimization may be reformulated as finding a value θ that minimizes $-\text{tr}({}^2R_d)$, i.e. which minimizes $$-\text{tr}\left({}^{rot}R_2^T\exp\left(\begin{bmatrix}\theta\\0\\0\end{bmatrix}\right){}^{rot}R_1\right).$$

Whilst this is still non-linear it does admit a closed-form solution and for this reason is used in preferred embodiments of the invention.

The Lagrangien L for this minimization is $$L = -\text{tr}\left({}^{rot}R_2^T\exp\left(\begin{bmatrix}\theta\\0\\0\end{bmatrix}\right){}^{rot}R_1\right).$$

For a minimization that admits a Lagrangien L, we have $$0 = \frac{\partial L}{\partial \theta}$$

$$= \frac{\partial}{\partial\theta}\left(-\text{tr}\left({}^{rot}R_2^T\exp\left(\begin{bmatrix}\theta\\0\\0\end{bmatrix}\right){}^{rot}R_1\right)\right)$$

$$= -\text{tr}\left({}^{rot}R_2^T\frac{\partial}{\partial\theta}\left(\exp\left(\begin{bmatrix}\theta\\0\\0\end{bmatrix}\right)\right){}^{rot}R_1\right)$$

As $\exp\left(\begin{bmatrix}\theta\\0\\0\end{bmatrix}\right) = \begin{pmatrix}1 & 0 & 0\\0 & \cos\theta & -\sin\theta\\0 & \sin\theta & \cos\theta\end{pmatrix}$, $$\frac{\partial}{\partial\theta}\left(\exp\left(\begin{bmatrix}\theta\\0\\0\end{bmatrix}\right)\right) = \begin{pmatrix}1 & 0 & 0\\0 & -\sin\theta & -\cos\theta\\0 & \cos\theta & -\sin\theta\end{pmatrix}.$$

If $$^{rot}R_1 = \begin{pmatrix}xx_1 & xy_1 & xz_1\\yx_1 & yy_1 & yz_1\\zx_1 & zy_1 & zz_1\end{pmatrix} \text{ and } {}^{rot}R_2 = \begin{pmatrix}xx_2 & xy_2 & xz_2\\yx_2 & yy_2 & yz_2\\zx_2 & zy_2 & zz_2\end{pmatrix}$$

then the above minimization equates to:

$$(yx_1zx_2 - yx_2zx_1 + yy_1zy_2 - yy_2zy_1 + yz_1zz_2 - yz_2zz_1)\cos\theta -$$
$$(yx_1yx_2 + zx_2zx_1 + yy_1yy_2 + zy_2zy_1 + yz_1yz_2 - zz_2zz_1)\sin\theta = 0$$

so that $$\theta = \tan^{-1}\frac{yx_1zx_2 - yx_2zx_1 + yy_1zy_2 - yy_2zy_1 + yz_1zz_2 - yz_2zz_1}{yx_1yx_2 + zx_2zx_1 + yy_1yy_2 + zy_2zy_1 + yz_1yz_2 - zz_2zz_1}.$$

Again, it will be appreciated that the above calculation is based on rotation of the control frame 702 about the x-axis of the rotation frame 1300 being the only rotation allowed. The analogous calculation applies mutatis mutandis if, say, rotation of the control frame 702 about the y-axis or the z-axis of the rotation frame 1300 were the only rotation allowed.

It will be appreciated that the above description has been presented as one way to demonstrate how to calculate the angle θ and that other mathematical constructs, frameworks and representations (such as the use of quaternions and/or geometric algebra) could be used instead.

5.2—Control Modification 1: Modification of the Controller

Another way to implement the above-mentioned embodiment of the invention is to modify how the control is actually applied (as opposed to determining a different control to apply as described above). As mentioned above, the physics engine module 808 may be used to implement and apply implicit control. Applying implicit control to an object part 700 comprises simulating a connection between the control frame 702 and the target frame 704, where this connection has a simulated resilience. This resilience is such that the physics engine module 808, in applying the simulated laws of physics to simulate the resilience, reduces the difference between the control frame 702 and the target frame 704.

In one embodiment of the invention that makes use of feature (b) above, the connection is constrained such that the resilience, in reducing (or causing a reduction in via the physics engine module 808) the difference between the control frame 702 and the target frame 704 can cause a movement of the object part 700 that only has a substantially non-zero component along the/each identified degree of freedom of the object part 700. Similarly, in one embodiment of the invention that makes use of feature (b') above, the connection is constrained such that the resilience, in reducing (or causing a reduction in via the physics engine module 808) the difference between the control frame 702 and the target frame 704, cannot cause movement of the object part 700 that has a substantially non-zero component along an identified degree of freedom of the object part 700.

For this, the object data 600 stored in the memory for the object 200 may include data specifying one or more constraints for the connection. In particular, the data specifying these constraints may indicate how one end of the connection (i.e. at the control frame 702) may move relative to the other end of the connection (i.e. at the target frame 704). This may make use of standard constraint techniques as are used, for example, to specify that a joint between two bones of an object 200 is a "ball and socket" joint or a "pivot" joint or a "hinge" joint. For example, the constraints could specify that the rotation of the control frame 702 end of the connection is limited to hinge movement about the target frame 704 end of the connection (so that the only rotation permissible is about one axis), with translation of the control frame 702 end of the connection being limited to translation in the plane orthogonal to the hinge axis. As another example, the constraints could specify that the rotation of the control frame 702 end of the connection is limited to ball and socket style movement about the target frame 704 end of the connection (so that all rotations of the object part 700 are allowed), but with changes to the length of the connection being prohibited (so that translation of the control frame 702 end of the connection towards the target frame 704 end of the connection is not allowed). It will, of course, be appreciated that other constraint combinations may be imposed on the simulated connection so as to limit the movement of the object part 700 in accordance with the specified degrees of freedom when control is applied to the object part 700.

5.3—Control Modification 1: Multiple Applications of Control to an Object Part

The above embodiments of the invention may be applied multiple times to a single object part 700 for a single animation update step. In particular, in one embodiment of the invention there is provided a method of animating the virtual object 200 within the virtual world 202. For an object part 700, there may be a plurality of identified degree of freedom groupings. Here, a "degree of freedom grouping" identifies one or more respective degrees of freedom of the object part 700. The degree of freedoms in a degree of freedom grouping may be rotational and/or translational degrees of freedom as have been described above. Different degree of freedom groupings may specify different combinations of different rotational and/or translational degrees of freedom and may specify different numbers of degrees of freedom. The degree of freedom groupings may be defined by data forming the object data 600 for the object 200.

At the animation update step (as described, for example, with reference to FIG. 9), control is applied (as explicit control, implicit control, or otherwise). This is carried out by, at the animation update step, for each degree of freedom grouping: specifying a respective target frame 704 in the virtual world 202; specifying a respective control frame 702 in the virtual world 202, the control frame 702 being a frame at a respective known (and possibly predetermined) position and orientation in the virtual world relative to the object part 700; and applying control to the object part 700, wherein the control is arranged such that the application of the control in isolation to the object part 700 would cause a movement of the object part 700 in the virtual world 202 that (a) reduces the difference between the respective control frame 702 and the target frame 704 and (b) either has a substantially zero component along each of the one or more identified degrees of freedom of that degree of freedom grouping or has a substantially non-zero component along at most the one or more identified degrees of that degree of freedom grouping.

Thus the application of control for a degree of freedom grouping may be carried out as has been described above in sections 5.1 and 5.2. However, as there are multiple degree of freedom groupings for the object part 700, then at a single animation update step there will be multiple controls being applied to that single object part 700. The application of these multiple controls may be different from degree of freedom grouping to degree of freedom grouping (other than simply by virtue of the different degree of freedom groupings specifying different sets of degrees of freedom for the object part 700). For example, the control applied for one degree of freedom grouping may be an implicit control whilst the degree of freedom grouping applied for another degree of freedom grouping may be an explicit control. If the control applied for two degree of freedom groupings are both implicit control, then the associated "elastic connections" may have different degrees of elasticity and therefore provide different rates of response/movement—in other words, the elasticity or resilience of the respective virtual connections may be isotropic or anisotropic. As mentioned above, the elasticity or resilience of these virtual connections may be uniform/linear or may be non-uniform/non-linear with respect to the distance between a control frame and a target frame and/or with respect to the angle between a control frame and a target frame, and may or may not include (or involve the application of) various components (e.g. damping) to reduce or lessen the resilience/elasticity as the respective control frames approach their corresponding target frames. If the control applied for two degree of freedom groupings are both explicit control, then the determination of respective virtual wrenches carried out for the two degree of freedom groupings may be carried out in different ways. Moreover, different degree of freedom groupings may be different respective control frames 702 and different respective target frames 704 (although this need not necessarily be the case).

In this way, the use of multiple degree of freedom groupings for a single object part 700 enables even finer granularity on how control may by applied to a virtual object 200 and its object parts.

6—Control Modification 2

An additional or alternative method of applying control is described below. In summary, when an action (or control) is applied to a particular object part, then a counter-action (or counter-control) is applied to one or more other object parts (that are associated with the particular object part). These counter-actions (or counter-controls) are intended to compensate (to a certain degree) for the action (or control) applied to the particular object part, with the result of creating a more natural and realistic looking animation of the virtual object 200, in particular to simulate or better mimic real muscles and movement or actual animals.

Therefore, in one embodiment of the invention, at the animation update step (as described, for example, with reference to FIG. 9), control is applied (as explicit control, implicit control, or otherwise) to a first object part of the plurality of object parts that form the virtual object 200 as will be described shortly. This first object part has associated with it one or more second object parts—the identity of the particular second object part(s) to be associated with the first object part may be defined by data forming the object data 600. The animation update step comprises: specifying a target frame 704 in the virtual world 202; and applying control to the first object part, wherein the control is arranged such that the application of the control in isolation to the first object part would cause a movement of the first object part in the virtual world 202 that reduces the difference between the control frame 702 and the target frame 704 (again, the control frame 702 being a frame at a known, and possibly predetermined, position and orientation in the virtual world 202 relative to the first object part). Here, applying control to the first object part comprises moving the one or more second object parts associated with the first object part within the virtual world 202 to compensate for the movement of the first object part in the virtual world 202 that has been caused by applying the control to the first object part.

Figure 14:
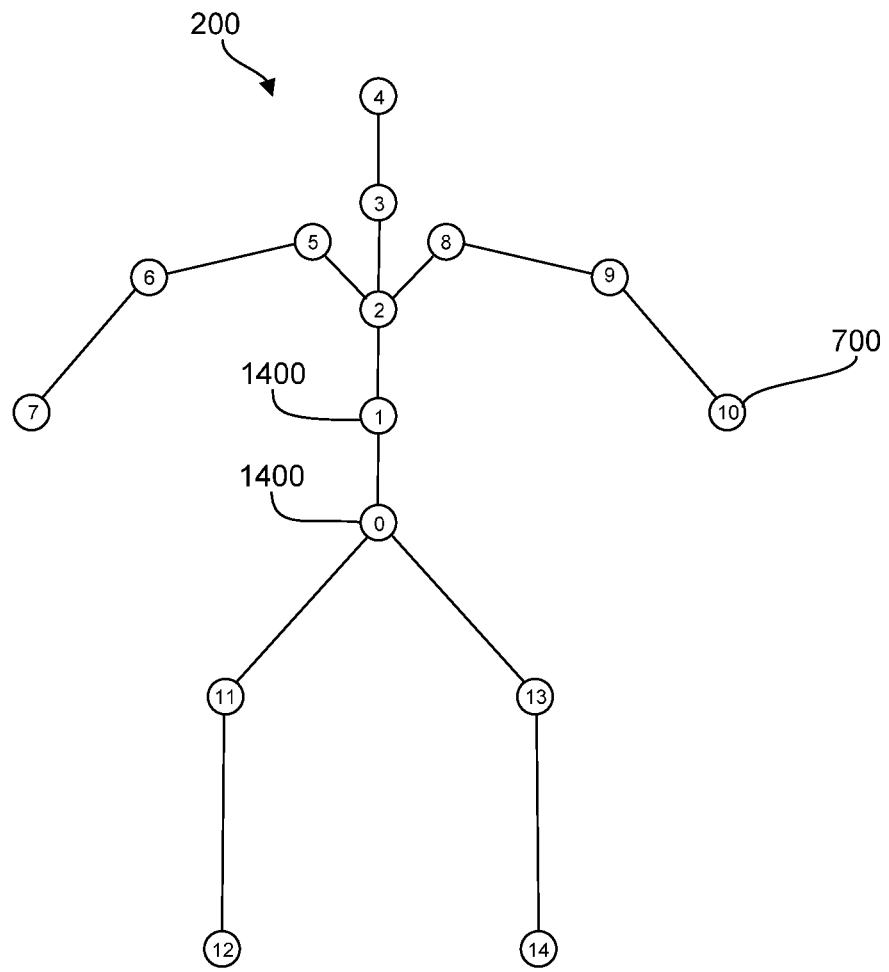
FIG. 14 schematically illustrates the same object shown in FIG. 3 with specific object parts highlighted for an embodiment of the invention.

FIG. 14 schematically illustrates the same object 200 shown in FIG. 3. In FIG. 14, a first object part 700 is shown as being at the end of the character's arm, but it will be appreciated that the first object part 700 could be any of the object parts forming the object 200. Similarly, two second object parts 1400 associated with the first object part 700 are illustrated, but it will be appreciated that there may be fewer or greater numbers of second object parts 1400 associated with the first object part 700. In FIG. 14, one of the second object parts 1400 is shown as representing part of the groin area of the character and the other second object part 1400 is shown as representing part of the abdomen of the character, but it will be appreciated that they could be any of the object parts forming the object 200 (other than the first object part 700 to which they are associated). Again, these object parts could be joints or bones of the object 200, but this embodiment will be illustrated by having the first and second object parts as joints.

It should be noted that the movement of the second object parts that would result from the application of control to the first object part 700 as described above for this embodiment of the invention is independent of any movement of the second object parts that would result due to either the topological linkage of the object parts as described by the topological data 608 for the object 200 or the application of control specifically directed to those second object parts.

The implementation of this embodiment of the invention shall be described below separately for (i) when this embodiment is implemented in association with the application of explicit control and (ii) when this embodiment is implemented in association with the application of implicit control.

6.1—Control Modification 2: Implementation with Explicit Control

Figure 15:
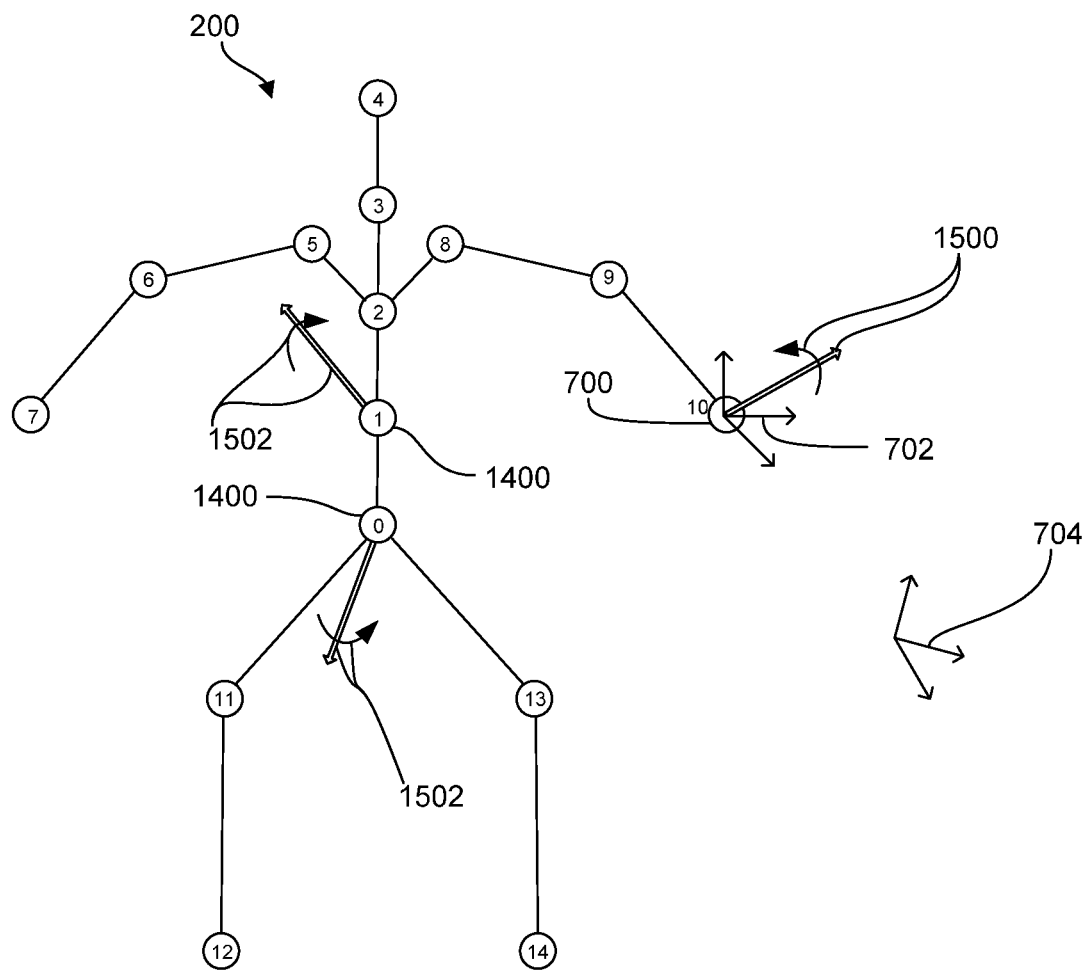
FIG. 15 schematically illustrates the concepts involved in implementing an embodiment of the invention with explicit control.
Figure 16:
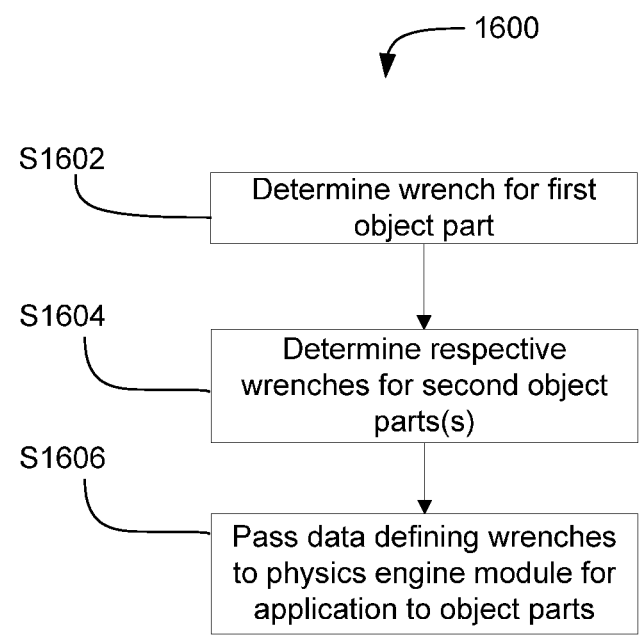
FIG. 16 is flowchart schematically illustrating a method that forms the processing performed by a controller module when carrying out an embodiment of the invention.

FIG. 15 schematically illustrates the concepts involved in implementing this embodiment of the invention with explicit control. FIG. 15 is the same as FIG. 14 together with some addition further features illustrated. FIG. 16 is flowchart schematically illustrating a method 1600 that forms the processing performed by the controller module 806 responsible for the first object part 700 when carrying out this embodiment of the invention.

As discussed above, when the control to be applied is explicit control, the controller module 806 responsible for the first object part 700 determines a virtual wrench 1500 for application to the first object part 700. As described with reference to FIG. 7, this virtual wrench 1500 is calculated such that the application of that virtual wrench 1500 in isolation to the first object part 700 would cause movement of the first object part 700 within the virtual world 202 that reduces the difference between a control frame 702 associated with the first object part 700 and a target frame 704 for the first object part 700 (which may, or may not, have been determined as described in section 5.1 above). The calculation of this virtual wrench 1500 therefore forms a step S1602 of the method 1600.

At a step S1604 of the method 1600, for each of the one or more second object parts 1400, a respective second virtual wrench 1502 is computed. This shall be described in more detail below.

Finally, at a step S1606 of the method 1600, the controller module 806 passes data defining the virtual wrench 1500 for the first object part 700 and data defining the respective second virtual wrenches 1502 for the second object parts 1400 to the physics engine module 808. The physics engine module 808 may then, as usual, simulate applying the laws of physics and, in particular, simulate the application of the virtual wrench 1500 to the first object part 700 and the respective second virtual wrenches 1502 to their second object parts 1400 so as to move both the first object part 700 and the second object parts 1400 within the virtual world 202.

The calculation of the virtual wrenches 1502 for the second object parts 1400 shall be described below in more detail. In summary, though, for the movement of the second object parts 1400 to compensate (at least to a degree) for the movement of the first object part 700, for each of the one or more second object parts 1400, computing the respective virtual wrench 1502 may be dependent on the virtual wrench 1500 for the first object part 700. In particular, the virtual wrenches 1400 for the second object parts 1400 may be determined such that the sum of the effects at a particular location within the virtual world 202 of the virtual wrench 1500 for the first object part 700 and the respective virtual wrenches 1502 for each of the one or more second object parts 1400 is substantially zero—in this way, the virtual wrenches being applied to the various object parts of the object 200 are "internal wrenches", i.e. have the appearance of being applied internal to the object 200 as opposed to seemingly being wrenches applied to the object 200 from outside of the object 200. This results in more realistic object movement/animation.

There are many ways in which the virtual wrenches 1502 may be determined for the second object parts 1400. A specific example is given below, but it should not be taken as limiting the invention.

As notation, the virtual wrench 1500 for application to the first object part 700 shall be assumed to comprise a virtual force $f^1$ and a virtual torque $\tau^1$ and, if there are N second object parts 1400, then their respective virtual wrenches 1502 shall be assumed to comprise a respective virtual force $f_i^2$ and a respective virtual torque $\tau_i^2$ for i=1 ... N. The question, then, is determining $f_i^2$ and $\tau_i^2$ from $f^1$ and $\tau^1$.

For the virtual wrenches 1502 to generate movement of the second object parts 1400 that compensates for the movement of the first object part 700, these virtual wrenches 1502 may be calculated so as to balance (or cancel out) the virtual wrench 1500 to be applied to the first object part 700 (i.e. so that there is no, or substantially no, net virtual wrench generated for the object 200 by this controller module 806, thereby "internalising" these virtual wrenches as discussed above).

Thus, $f_i^2$ can be set to be equal to $-w_i f^1$ for some weights $w_i$ where $0 \le w_i \le 1$ and $$\sum_{i=1}^{N} w_i$$

equals 1 (or a value close to 1). In this way, $$\sum_{i=1}^{N} f_i^2 = -f^1$$

and the sum of the forces of the virtual wrenches 1502 for application to the second object parts 1400 cancels the force of the virtual wrench 1500 for application to the first object part 700.

Each pair $(f_i^2, w_i f^1)$ induces a torque $\tau_i^{ind}$. Here, $\tau_i^{ind} = r_i \times w_i f^1$ (as expressed at the point where the force $f^1$ and torque $\tau^1$ are applied), where $r_i$ is the vector representing the lever arm from the location at which the force $f_i^2$ will be applied (i.e. the location of the i-th second object part 1400) to the location at which the force $f^1$ will be applied (i.e. the location of the first object part 700). Thus, the total complementary torque $\tau^{comp}$ that needs to be generated by the torques of the virtual wrenches 1502 for application to the second object parts 1400 in order for these torques to cancel both the torque of the virtual wrench 1500 for application to the first object part 700 and the torques generated by the forces of all of the virtual wrenches 1400 and 1502 is $$\tau^{comp} = -\left(\tau^1 + \sum_{i=1}^{N} \tau_i^{ind}\right) = -\left(\tau^1 + \sum_{i=1}^{N} (r_i \times w_i f^1)\right).$$

Thus, $\tau_i^2$ can be set to be equal to $w'_i \tau^{comp}$ for some weights $w'_i$ where $0 \le w'_i \le 1$ and $$\sum_{i=1}^{N} w'_i$$

equals 1 (or a value close to 1). Note that the above equation $\tau_i^{ind} = r_i \times w_i f^1$ ensures that the wrenches are all expressed as wrenches being applied at the same point—in this example, this point is the location at which the force $f^1$ and torque $\tau^1$ will be applied. However, it will be appreciated that any other point could be chosen and that the sum of the virtual wrenches (both the wrench 1500 and the compensatory wrench(es) 1502), when expressed at that chosen point, is substantially zero—which makes the combined action "internal".

The above weights $w_i$ and $w'_i$ may be stored as data forming part of the object data 600.

6.2—Control Modification 2: Implementation with Implicit Control

Figure 17A:
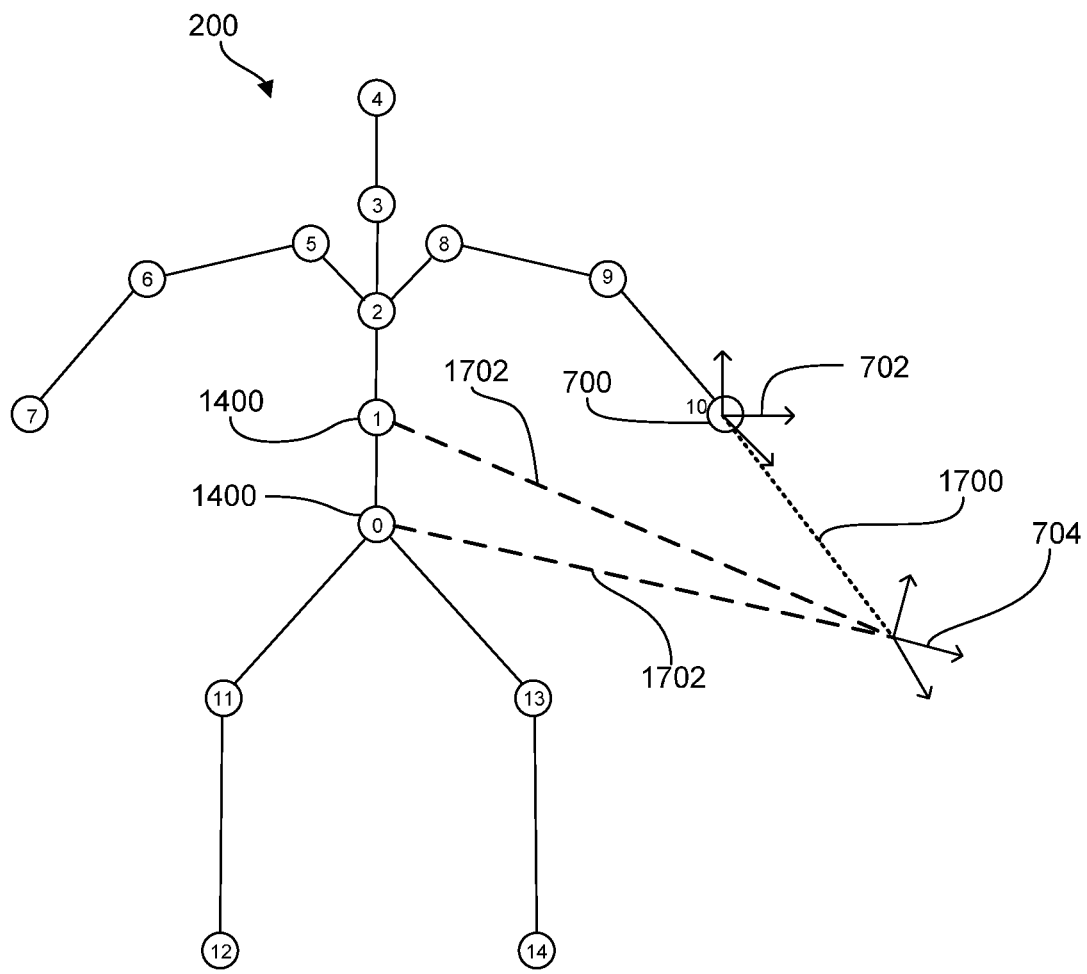
FIG. 17A schematically illustrates the concepts involved in implementing an embodiment of the invention with implicit control at the beginning of an animation update step.

FIG. 17A schematically illustrates the concepts involved in implementing this embodiment of the invention with implicit control. FIG. 17A is the same as FIG. 14 together with some addition further features illustrated.

As discussed above, when the control to be applied is implicit control, the physics engine module 808 simulates an elastic connection linking the control frame 702 for the first object part 700 with the target frame 704 for the first object part 700. This is shown in FIG. 17A as a dotted line 1700. It is the elasticity of this connection 1700 that causes the physics engine module 808 (in simulating the elasticity) to move the first object part 700 within the virtual world 202 so that the difference between the control frame 702 and the target frame 704 is decreased.

In implementing this embodiment of the invention via implicit control, the physics engine module 808 will, at an animation update step (in particular at the step S916 of FIG. 9 as described above) move each of the one or more second object parts 1400 so that, for each second object part 1400, the target frame 704 is maintained at substantially the same location and orientation relative to that second object part 1400 during the animation update step. Hence, at the beginning of the processing 900 for an animation update step, the second object parts 1400 will be at respective locations within the target frame 704. The physics engine module 808 is arranged such that, should the target frame 704 move, then the second object parts 1400 will also be moved so as to retain their original position within the target frame 704 at the end of the processing 900 for the animation update step. In particular, the resilience (or elasticity) of the connection 1700, in reducing the difference between the control frame 702 and the target frame 704 may cause at least a change of the location and/or orientation of the target frame 704. Should this happen, then this will induce a movement of the one or more second object parts 1400.

One way in which the physics engine module 808 may implement this is, for each second object part 1400, to simulate, at each animation update step, a rigid (i.e. non-elastic) non-moveable) connection/link 1702 between that second object part 1400 and the end of the elastic connection 1700 located at the target frame 704. A rigid connection 1702 is "rigid" in that it maintains the target frame 704 at a fixed position and orientation relative to the second object part 1400 for the duration of the animation update step (and the physics simulation step that follows). The rigid connection 1702 for a second object part 1400 may, however, change from one animation update step to the next animation update step to take into account (for example) changes in the target frame 704, so that the target frame 704 may be maintained at a different location and orientation relative to the second object part 1400 for the subsequent animation update step.

It will, however, be appreciated that the physics engine module 808 may make use of any other suitable way of maintaining the target frame 704 at a fixed position and orientation relative to the second object part 1400 for the duration of the animation update step.

Figure 17B:
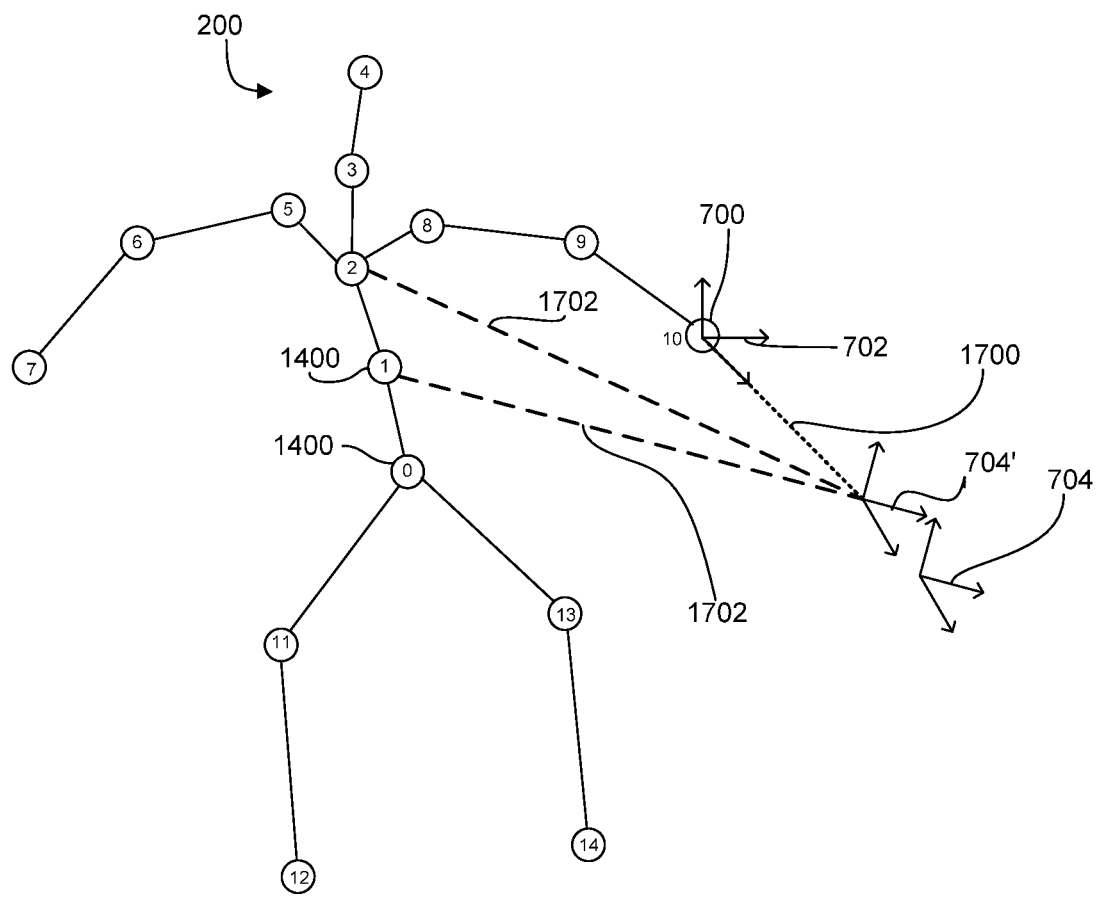
FIG. 17B schematically illustrates the concepts involved in implementing an embodiment of the invention with implicit control at the end of an animation update step.

FIG. 17A schematically illustrates the situation at the beginning of an animation update step; FIG. 17B schematically illustrates the corresponding outcome at the end of that animation update step according to an embodiment of the invention. As can be seen, the effect of the elastic connection

1700 and the rigid connection 1702 for each second object part 1400 has caused a movement of the target frame 704 from its original location and orientation to a new location and orientation, as represented by a new/updated target frame 704'. The difference between the control frame 702 and the updated target frame 704' is less than the difference between the control frame 704 and the original target frame 704, and this is due to the elasticity of the connection 1700 (the length of the connection 1700 is smaller in FIG. 17B than it is in FIG. 17A, for example). However, second object parts 1400 have moved such that the position and orientation of the updated target frame 704' with respect to the now-moved second object parts 1400 is the same as the position and orientation of the original target frame 704 with respect to the originally positioned second object parts 1400 (of FIG. 17A).

One drawback of the above approach is that the first object part 700 and its control frame 702 are drawn towards the updated target frame 704' instead of towards the originally specified target frame 704. Whilst subsequent animation update steps that re-specify the original target frame 704 will eventually draw the first object part 700 and its control frame 702 towards the original target frame 704 (since the updated target frame 704' will become less and less distinct from the original target frame over a series of animation update steps), in the embodiment to be described below, this problem is solved (or the effects of it are at least reduced), thereby generating a more realistic animation of the object 200 and one that is closer to the initially desired animation.

Figure 18A:
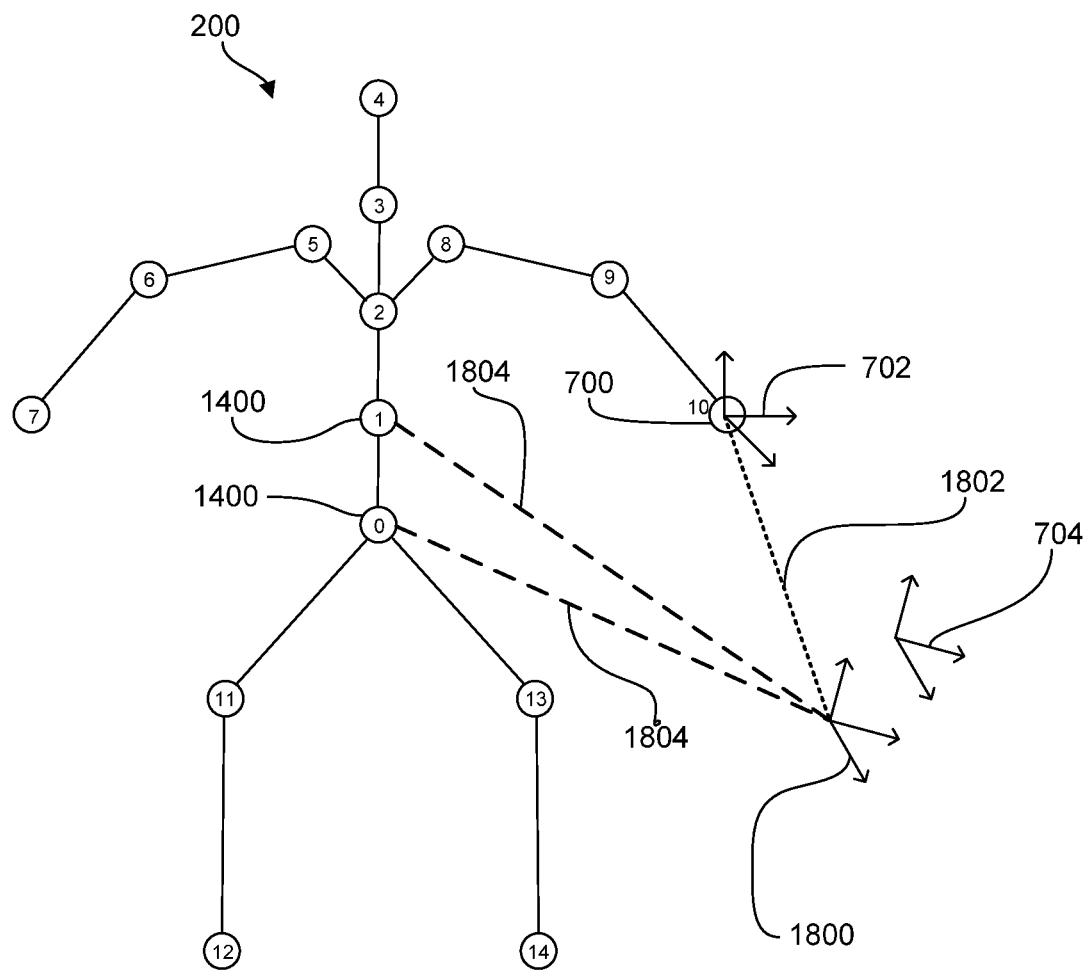
FIG. 18A schematically illustrates the concepts involved in implementing an embodiment of the invention with implicit control at the beginning of an animation update step.

In one embodiment of the invention, prior to applying the implicit control to the first object part 700 (i.e. prior to the physics engine module 808 determining how the resilience of the link 1700 between the control frame 702 and the target frame 704 will move the first object part 700), the target frame 704 to use is updated (or changed or modified). This is schematically illustrated in FIG. 18A, which is the same as FIG. 17A except that an updated target frame 1800 is illustrated. The resilient connection 1700 for the first object part 700 is now shown as a resilient connection 1802 in FIG. 18A that links the control frame 702 and the updated target frame 1800—i.e. the resilient connection for the first object part 700 is not linked to the target frame 704 but to the updated target frame 1800 instead. Similarly, the rigid connections 1702 for the second object parts 1400 are now shown as rigid connections 1804 in FIG. 18A that link the second object parts 1400 and the updated target frame 1800—i.e. the rigid connections for the second object parts 1400 are not linked to the target frame 704 but to the updated target frame 1800 instead.

Figure 18B:
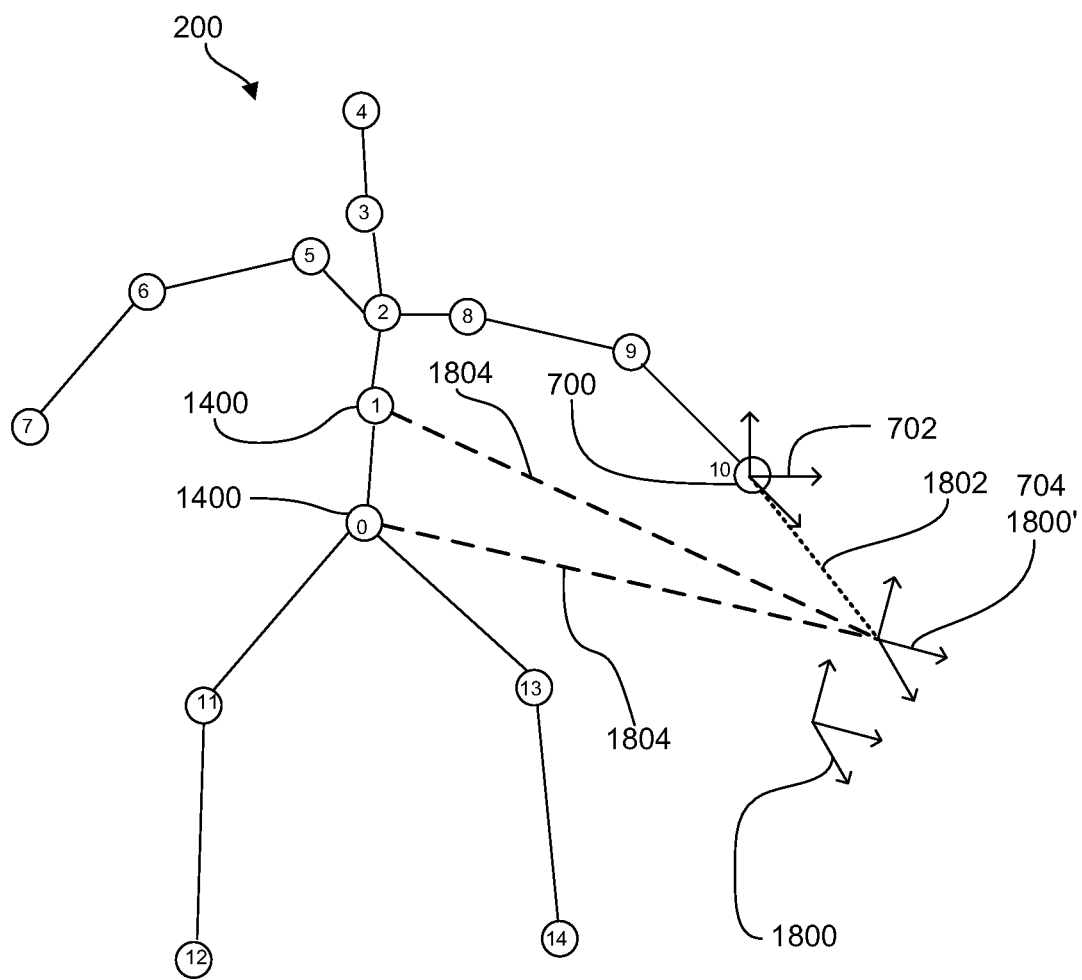
FIG. 18B schematically illustrates the concepts involved in implementing an embodiment of the invention with implicit control at the end of an animation update step.

The updated target frame 1800 is determined such that the resilience of the elastic connection 1802, in reducing the difference between the control frame 702 and the updated target frame 1800 would cause at least a change of the location and/or orientation of the updated target frame 1800 so as to substantially align the updated target frame 1800 with the initially specified target frame 704. FIG. 18A schematically illustrates the situation at the beginning of an animation update step; FIG. 18B schematically illustrates the corresponding outcome at the end of that animation update step according to this embodiment of the invention. As can be seen, the updated target frame 1800 that has been used has itself now been updated to become an updated target frame 1800' as a result of the elasticity of the connection 1802 moving the updated target frame 1800 over one animation update step. However, the updated target frame 1800' is now substantially coincident with the originally specified target frame 704 so that the effect of this animation update step is that the first object part 700 and its control frame 702 have been correctly drawn towards the original target frame 704.

To update the initial target frame 704 and derive the updated target frame 1800, the physics engine module 808 and/or the main program 800 may estimate or predict the change of the location and/or orientation for the initially specified target frame 704 that would result from the resilience reducing the difference between the control frame 702 and the initially specified target frame 704 at the animation update step. In other words, the difference between the target frame 704 and the updated target frame 704' of FIG. 17B is estimated. The initially specified target frame 704 may then be updated to form the updated target frame 1800 for use in FIG. 18A by applying an inverse of the estimated change to the target frame 704. In other words, the updated target frame 1800 is determined such that, if the estimated change were applied to the updated target frame 1800, then the changed updated target frame 1800 would equal the initially specified target frame 704. The above prediction/estimation may be carried out in a number of ways, such as by using the physics engine module 808 to simulate the result of using the originally specified target frame 704 (i.e. to determine the outcome shown in FIG. 17B) in order to be able to compute the difference between the updated target frame 704' of FIG. 17B and the originally specified target frame 704 in FIG. 17A—this simulation would, of course, not form part of the actual animation itself.

It will be appreciated, though, that there are other ways in which the originally specified target frame 704 may be modified prior to applying the control to the first object part 700 so as to compensate for changes to that target frame 704 due to the application of the control.

7—Control Modification 3: Mixed Control

The above-described methods of applying control are examples of a class of control known as "task-space inverse-dynamics", or often just "inverse-dynamics". Task-space inverse-dynamics involves specifying a target frame 704 for an object part 700 and then applying a wrench to that object part 700 so as to move the object part 700 to try to align its control frame 702 with the target frame 704. This involves determining the wrench—either explicitly as a calculation of a force and/or torque for the wrench (as in the controller module 806) or indirectly by the simulation of physics properties (such as simulating resilient links which indirectly implement the application of the virtual wrench via the physics engine module 808).

Other known classes of control include the following:

Forward-kinematics. This involves specifying and applying angles for the joints of the object 200. However, it is difficult with forward kinematics methods to move an object part to a particular intended location and/or orientation.

Inverse-kinematics. This involves specifying, for one or more object parts (or for respective control frames 702 for the one or more object parts), a respective target position and orientation (e.g. a target frame 704)—i.e. specifying a desired configuration (or pose/posture) for the object 200. The inverse-kinematics processing then calculates a configuration (or one or more configuration parameters) for the joints of the object 200 that would cause the one or more object parts (or their respective control frames 702) to have their position and orientation become coincident with (or at least try to become coincident with or approximate) those of the respective target frames 704. The configuration may specify the angle of a joint (i.e. the angle between the two bones connected by that joint)—in this case, one or more of the configuration parameters may actually be data explicitly defining that angle, although it will be appreciated that the angle of a joint may be set implicitly by other types of configuration parameter. The configuration may specify additional or alternative properties of the joint—for example, if the joint allows for relative translations of the bones it is connecting (e.g. a prismatic joint), then one or more of the configuration parameters may be data defining such a translation. It will be appreciated that inverse-kinematics processing may involve computing one or more of such joint configuration parameters, and that other types of joint configuration parameters may be computed in addition or as alternatives, depending on the nature of the joints and the type of representation being used to represent the object 200.

Forward-dynamics. This involves specifying one or more virtual wrenches for application to respective joints of the object 200, and then applying (e.g. by the physics engine module 808) the specified one or more virtual wrenches to their respective joints so as to produce (or invoke/cause) a movement of the object parts. However, as with forward-kinematics, it is difficult with a forward-dynamics method to move an object part to a particular intended location and/or orientation.

Joint-space inverse-dynamics. Due to the above limitations of purely forward-dynamics methods, joint-space inverse-dynamics involves the use of an inverse-kinematic step, a joint-space control step (see below) and then a forward-dynamics step. It should be noted that in some literature, joint-space inverse-dynamics may be referred to as forward-dynamics. However, it is a subset of forward-dynamics methods as it uses a particular technique (namely the inverse-kinematic step and the joint-space control step) to specify the one or more virtual wrenches for application to respective object parts of the object 200. In more detail then, joint-space inverse dynamics involves:

An inverse-kinematics step involving (i) specifying, for one or more object parts (or for respective control frames 702 for the one or more object parts), a respective target position and orientation (e.g. a target frame 704) and then (ii) calculating joint configuration parameters for the joints of the object 200 that would cause the one or more object parts (or their respective control frames 702) to have their position and orientation become coincident with (or at least try to become coincident with or approximate) those of the respective target frames 704.

A joint-space control step involving calculating (or computing or determining) one or more virtual wrenches, the application of which to respective object parts of the object 200 would cause the joints of the object 200 to assume their respective calculated joint configuration parameters (i.e. so as to make use of, or apply, the joint configuration parameters calculated at the inverse-kinematics step).

A forward-dynamics step involving applying (e.g. by the physics engine module 808) the calculated one or more virtual wrenches to/at their respective object parts.

Task-space inverse-dynamics and joint-space inverse-dynamics differ in that joint-space inverse-dynamics operates in so-called "joint-space" whilst task-space inverse-dynamics operates in so-called "task-space". Here, "joint-space" means the set of joint configuration parameters (e.g. angles of the joints) of the object 200 together with the relative hierarchy of the joints, whereas "task-space" means the actual position of a joint or object part within the virtual world 202 (or some other frame of reference) without needing to consider the actual joint configuration parameter of a joint (e.g. the angle between two object parts linked by a joint). In particular, joint-space inverse-dynamics involves calculating desired joint configuration parameters (e.g. angles that achieve a desired pose for the object 200), calculating wrenches to apply to object parts of the object 200 so as to achieve the desired joint configuration parameters, and then applying those wrenches. In contrast, task-space inverse-dynamics does not involve computing desired joint configuration parameters. Instead, task-space inverse-dynamics involves determining a wrench required to move an object part (or its control frame 702) from a current location towards a target location (or target frame 704). Whilst such a determination might make use of data representing joint configuration parameters, as mentioned above task-space inverse-dynamics does not involve computing or determining a wrench to achieve a desired joint configuration parameter but, instead, involves determining a wrench to as to achieve a desired movement in the virtual world 202.

As forward-kinematics, inverse-kinematics, forward-dynamics and joint-space inverse-dynamics (including the joint-space control step) methods are well-known in this field of technology, they shall not be described in detail herein.

Applying task-space inverse-dynamics control to an object 200 sometimes results in a "robotic"-looking animation for that object 200 (as shall be described shortly). However, task-space inverse-dynamics control provides flexibility in how one can apply control to an object 200 (e.g. applying explicit and/or implicit control, and/or modifying the task-space inverse-dynamics control as has been described above in sections 5 and 6) and is very efficient in terms of speed of convergence. It is therefore desirable to use task-space inverse-dynamics control if possible.

According to an embodiment of the invention, control may be applied to an object part by mixing (or applying a weighted combination of) both task-space inverse-dynamics control (such as the task-space inverse-dynamics control described in sections 5 and/or 6 above) and joint-space inverse-dynamics control, i.e. applying amounts or quantities of both task-space inverse-dynamics control and joint-space inverse-dynamics control to the same object 200 at a single animation update step to drive or control or move that object 200. The object parts to which the wrenches determined for task-space inverse-dynamics are applied may be the same as and/or different from the object parts to which the wrenches determined for joint-space inverse-dynamics are applied (i.e. these two sets of object parts may be the same, may overlap, or may not overlap).

In particular, the animation of the virtual object 200 within the virtual world 202 may be achieved by:

(a) Determining, for the application of joint-space inverse-dynamics control to the virtual object 200 based on a target configuration for the virtual object 200, one or more first virtual wrenches for application to respective object parts, wherein each of the first virtual wrenches comprises a respective virtual force and/or virtual torque. Here, the "target configuration" is the desired pose, orientation and location of the virtual object 200 and its object parts within the virtual world 202. In particular, this may involve (i) determining, for one or more of the plurality of joints, one or more corresponding target joint configuration parameters based on the target configuration for the virtual object 200—a joint configuration parameter may be a target angle representing an angle between the sections/bones linked by that joint; and (ii) determining a set of first virtual wrenches each comprising a respective virtual force and/or virtual torque for application to a respective object part, wherein the application of the set of first virtual wrenches to the respective object parts would cause each of the one or more of the plurality of joints to assume the corresponding target joint configuration parameter;

(b) Determining, for the application of task-space inverse-dynamics control to the virtual object 200 based on the target configuration, one or more second virtual wrenches for application to respective object parts, wherein each of the second virtual wrenches comprises a respective virtual force and/or virtual torque. In particular, this may involve determining, for one or more of the plurality of object parts, a respective second virtual wrench comprising a virtual force and/or virtual torque, wherein, for each second virtual wrench, the application of that second virtual wrench to the respective object part would move that object part in the virtual world 202 so as to reduce a difference between a current location and orientation of that object part and a target location and orientation for that object part, the target location and orientation being based on the target configuration for the virtual object.

(c) For each of the determined first virtual wrenches, applying a weighted version of that first virtual wrench to the respective object part and for each of the determined second virtual wrenches, applying a weighted version of that second virtual wrench to the respective object part.

Figure 19:
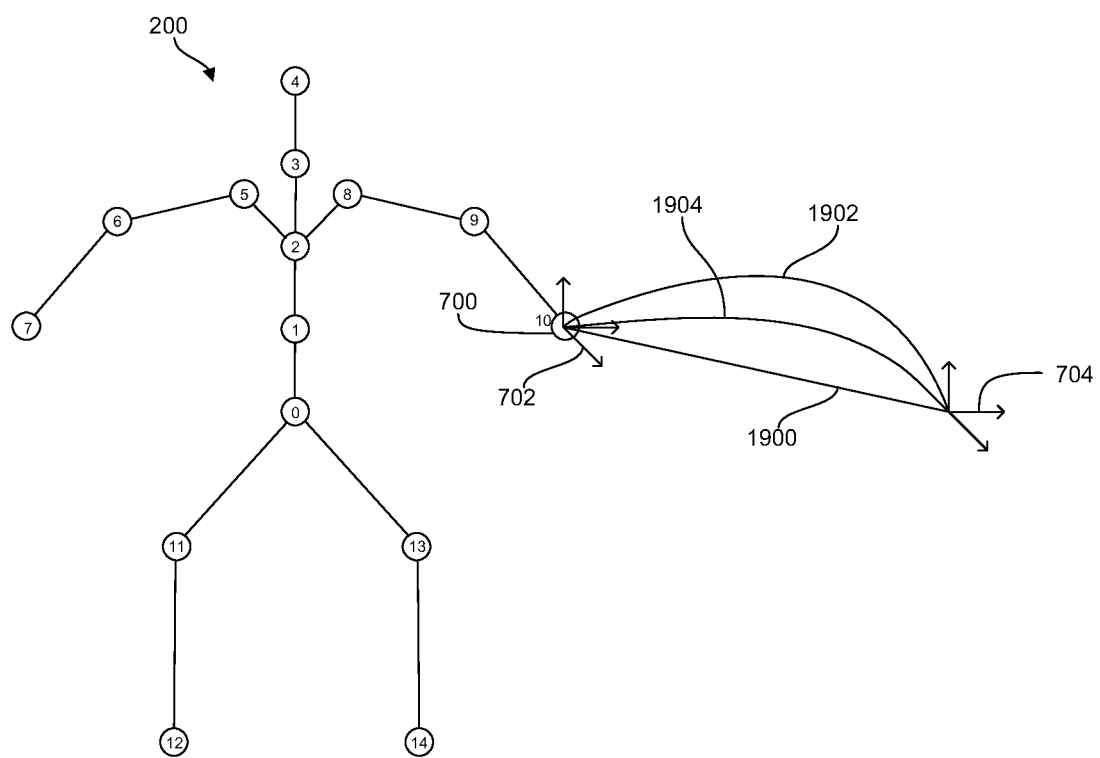
FIG. 19 schematically illustrates trajectories of an object part according to the application of control to that object part by different methods.
Figure 20:
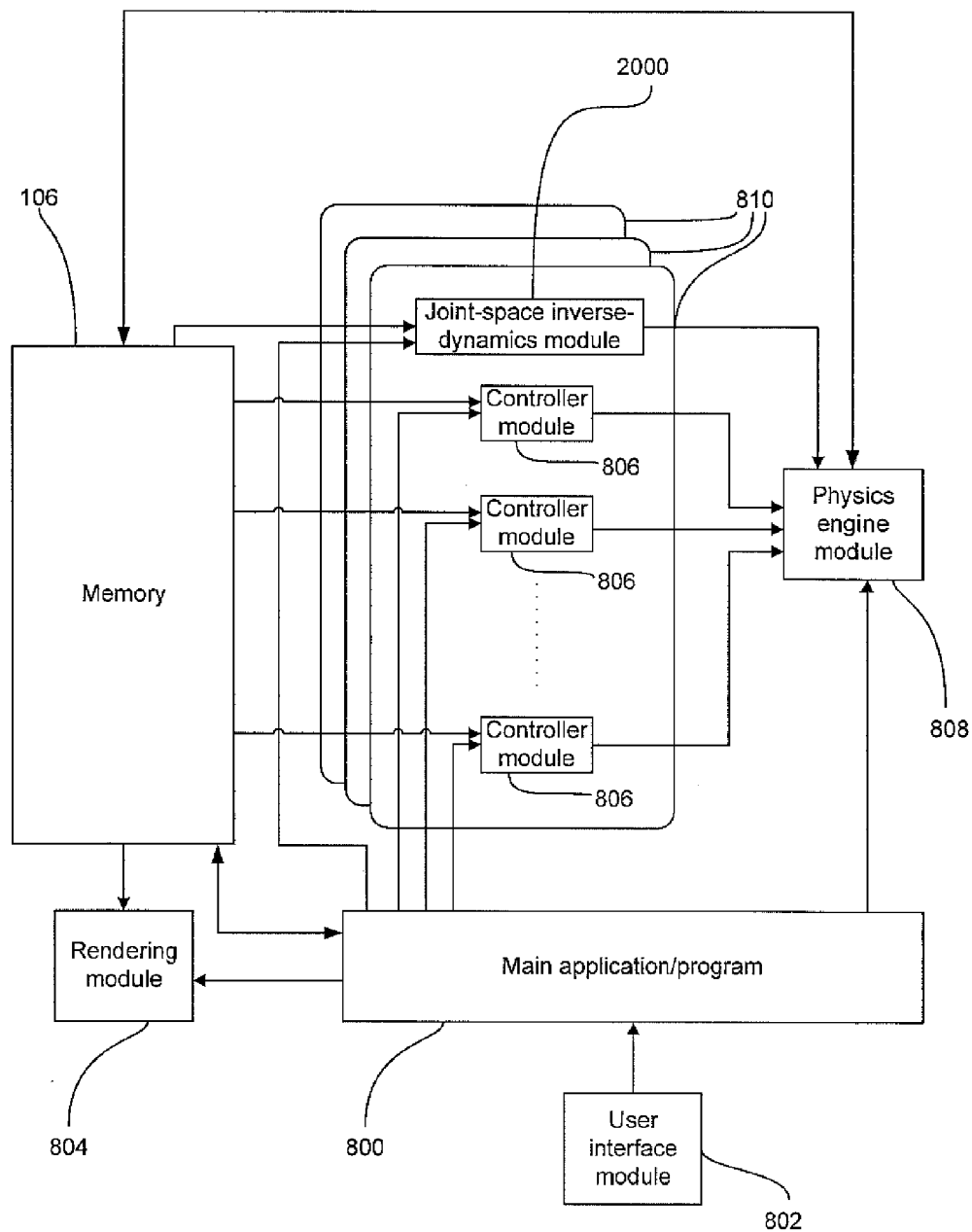
FIG. 20 schematically illustrates some of the software (computer program) modules used in an embodiment of the invention.
Figure 21:
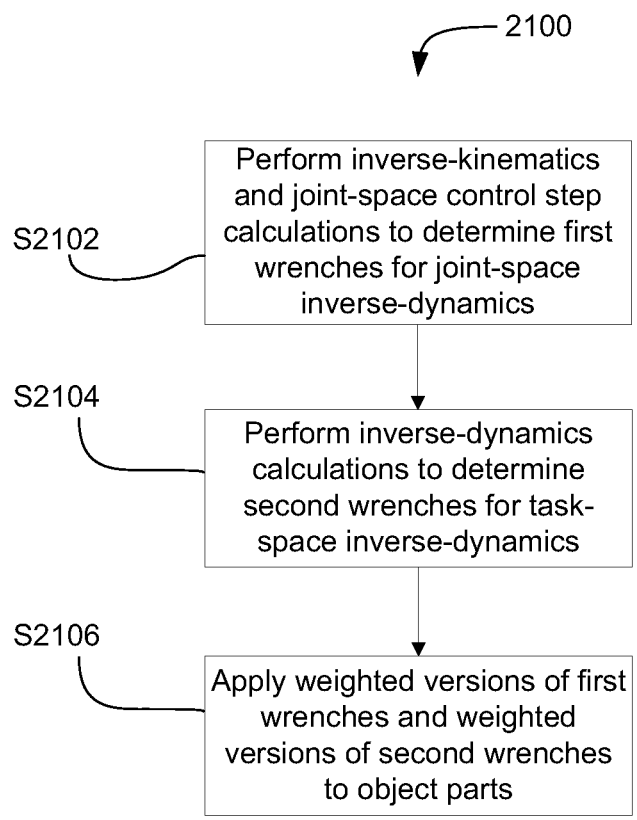
FIG. 21 is a flowchart schematically illustrating a method according to an embodiment of the invention.
Figure 22:
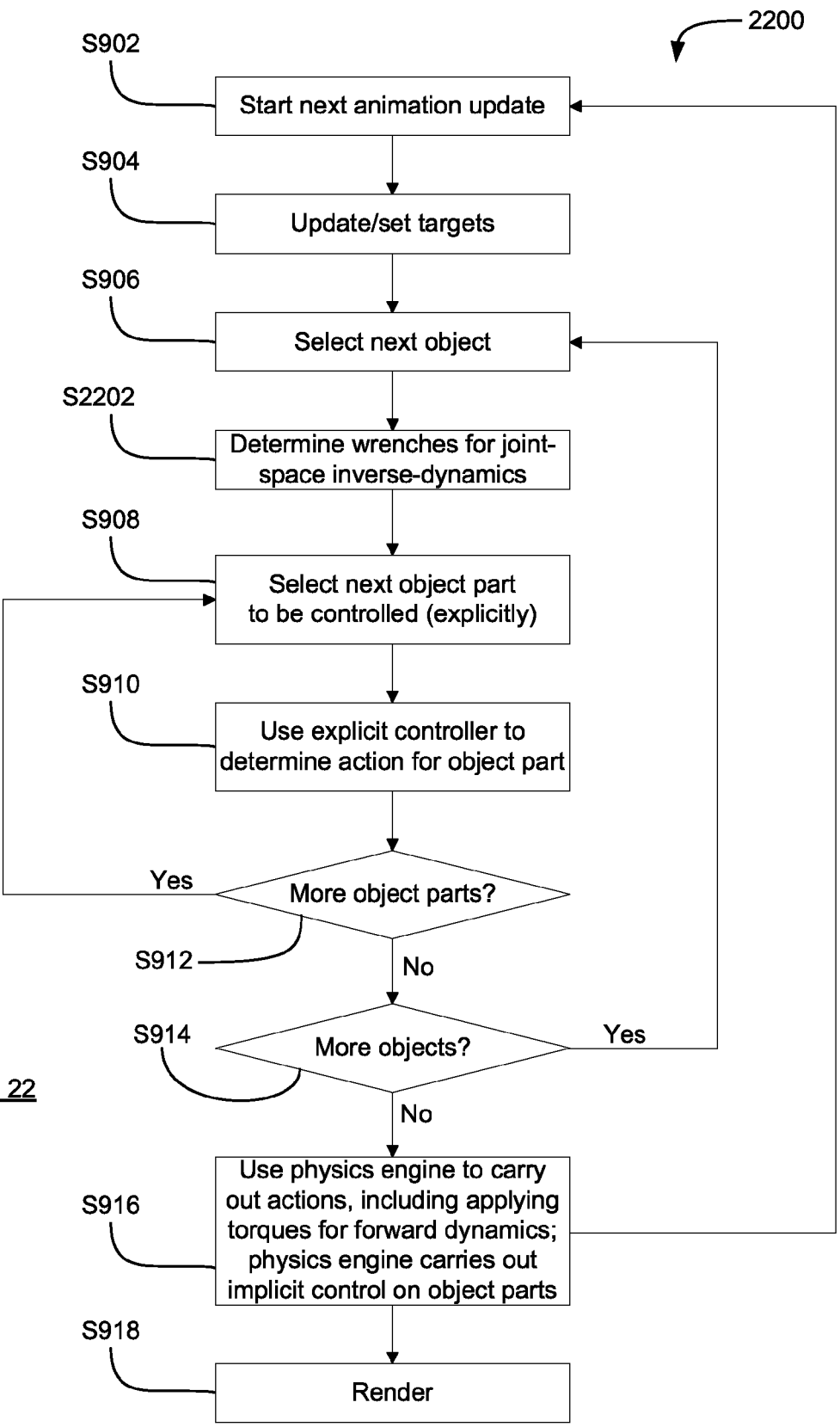
FIG. 22 is a flowchart schematically illustrating a method according to an embodiment of the invention.

This is illustrated in FIGS. 19-22: FIG. 19 schematically illustrates trajectories of an object part according to the application of control to that object part 700 by different methods; FIG. 20 schematically illustrates some of the software (computer program) modules used in this embodiment of the invention; and FIGS. 21 and 22 are flowcharts schematically illustrating methods according to an embodiment of the invention.

FIG. 19 schematically illustrates an object 200 in the virtual world 202 having an object part 700 with an associated control frame 702 and an associated target frame 704. Application of task-space inverse-dynamics control to the object part 700 would result in movement of the object part 700 according to a first trajectory 1900, so that the control frame 702 becomes (or at least tries to become) aligned with the target frame 704. As shown in FIG. 19, the first trajectory 1900 resulting from the task-space inverse-dynamics control is sometimes a relatively straight/direct trajectory and may therefore sometimes appear to result in an animation that is robotic-looking (i.e. less "natural" than may be desired). Application of joint-space inverse-dynamics control to the object part 700 would result in movement of the object part 700 according to a second trajectory 1902, so that the control frame 702 again becomes (or at least tries to become) aligned with the target frame 704. As shown in FIG. 19, the second trajectory 1902 resulting from the joint-space inverse-dynamics control is more natural-looking and rounded than the first trajectory 1900.

Therefore, in order to benefit from the flexibility and speed of task-space inverse-dynamics control (e.g. how task-space inverse-dynamics control may be calculated, modified and applied) whilst also achieving a more natural-looking animation and avoiding a robotic-looking animation, embodiments of the invention apply control to an object part, where the control is a (weighted) combination of both task-space inverse-dynamics and joint-space inverse-dynamics. Application of control according this embodiment of the invention (i.e. a mixture of task-space inverse-dynamics control and joint-space inverse-dynamics control) would result in movement of the object part 700 according to a third trajectory 1904, so that the control frame 702 becomes (or at least tries to become) aligned with the target frame 704. Here, the third trajectory 1904 is more natural-looking than the first trajectory 1900.

FIG. 20 schematically illustrates some of the software (computer program) modules used in this embodiment of the invention. FIG. 20 is exactly the same as FIG. 8 (and the description and possible modifications thereto for FIG. 8 apply equally to FIG. 20). In FIG. 20, for each object 200 (and possibly for each object part) to be animated, there may be a corresponding joint-space inverse-dynamics module 2000. The joint-space inverse-dynamics module 2000 may receive data defining a target frame 704 for one or more object parts 700 (i.e. a desired configuration for the object 200) from the main program 800 and may read data defining a control frame 702 for the object parts 700 (i.e. a current configuration for the object 200) from the memory 106. Based on the target frame(s) 704 and the control frame(s) 702, the joint-space inverse-dynamics module 2000 may perform an inverse-kinematics calculation and a joint-space control step in order to determine desired joint configuration parameters for the joints of the object 200 and then determine one or more virtual wrenches comprising a virtual force and/or a virtual torque to be applied at/to respective object parts of the object 200 in order to try to achieve or apply the desired joint configuration parameters (as has been described above). The joint-space inverse-dynamics module 2000 may then pass data defining those determined wrenches to the physics engine module 808 so that the physics engine module 808 can simulate the application of the laws of physics to the object 200, which includes applying the determined virtual wrenches to their respective joints. In this way, the physics engine module 808 performs a forward-dynamics control step using, as an input, the wrenches determined by the joint-space inverse-dynamics module 2000. Thus, the combined action of the joint-space inverse-dynamics module 2000 and the physics engine 808 results in the application of joint-space inverse-dynamics control to the object 200.

FIG. 21 is a flowchart schematically illustrating a method 2100 according to an embodiment of the invention.

At a step S2102, the joint-space inverse-dynamics module 2000 performs an inverse-kinematics calculation and a joint-space control step in order to determine desired joint configuration parameters for the joints of the object 200 and then one or more (first) virtual wrenches comprising a virtual force and/or a virtual torque to be applied at/to respective parts of the object 200 in order to try to achieve the desired joint configuration parameters (as has been described above), based on a target configuration for the object 200 (as has been described above). The determination of the virtual wrenches by the joint-space control step may be an explicit determination, e.g. an explicit calculation of the virtual wrench values by virtue of the calculations carried out by a joint controller in the joint-space inverse-dynamics module 2000 (when explicit control is being used). Additionally, or alternatively, in the same way as task-space inverse-dynamics can be explicit or implicit, the determination of the virtual wrench values by joint-space control may involve an implicit determination, e.g. the virtual wrenches are not explicitly calculated but are determined (or established) by setting properties of one or more simulated resilient connections for one or more joints of the object 200, the implementation of which by the physics engine module 808 aims to achieve the desired/calculated joint configuration parameters.

At a step S2104, a controller module 806 for the object part 700 and/or the physics engine module 808 performs a task-space inverse-dynamics calculation based on a respective target frame 704 and control frame 702 for one or more object parts. The control frame(s) 702 may be different from, or the may be the same as, ones used at the step S2102. However, the target frame(s) 704 used are based on the same target configuration as used at the step S2102. This inverse-dynamics calculation determines a virtual wrench comprising a virtual force and/or virtual torque, wherein the application of the virtual wrench to the object part 700 would move the object part 700 in the virtual world 202 so as to align (reduce the difference between) the control frame 702 and the target frame 704. The determination of the virtual wrench may be an explicit determination, e.g. an explicit calculation of the virtual wrench values by virtue of the calculations carried out by the controller module 806 (when explicit control is being used). Additionally, or alternatively, the determination of the virtual wrench may be an implicit determination, e.g. the virtual wrench is not explicitly calculated but is determined by setting properties of a simulated resilient connection between the control frame 702 and the target frame 704 (as described above) by the physics engine module 808.

It will be appreciated that the steps S2102 and S2014 may be carried out in any order or may be performed simultaneously.

At a step S2106, for each of the determined virtual wrenches, a weighted version of that virtual wrench is applied to the respective object part. The weights to be used may be stored as data forming part of the object data 600 for the object 200. The weights may be predetermined weights specified, e.g. as part of a computer game or animation configuration. Preferably, to help avoid undesired animation effects, the same (first) weight, $\alpha$, is used for all wrenches determined by/for task-space inverse-dynamics control and the same (second) weight, $\beta$, is used for all wrenches determined by/for joint-space inverse-dynamics control, but it will be appreciated that this need not be the case. This second weight $\beta$ may be the same as, or different from, the first weight $\alpha$. Preferably, $\alpha+\beta=1$ (where $\alpha$ and $\beta$ are positive values).

The weighting of the virtual wrenches determined by/for the joint-space inverse-dynamics may be achieved by (a) the joint-space inverse-dynamics module 2000 outputting weighted virtual wrenches to the physics engine module 808 (when explicit joint-space inverse-dynamics control is being used) and/or (b) the physics engine module 808 may itself weight the virtual wrench data that it receives (when explicit joint-space inverse-dynamics control is being used) and/or (c) the physics engine module 808 modifying (according to the weights) the level of resilience of the resilient connection that it simulates in order to apply implicit joint-space inverse-dynamics control. The weighting of the virtual wrenches determined by the task-space inverse-dynamics may be achieved by (a) the controller modules 806 outputting weighted virtual wrenches to the physics engine module 808 (when explicit task-space inverse-dynamics control is being used) and/or (b) the physics engine module 808 may itself weight the virtual wrench data that it receives (when explicit task-space inverse-dynamics control is being used) and/or (c) the physics engine module 808 modifying (according to the weights) the level of resilience of the resilient connections that it simulates between the target frames 704 and the control frames 702 in order to apply implicit task-space inverse-dynamics control. Additionally or alternatively, embodiments of the invention may make use of a module (not shown in FIG. 20) that receives data from the joint-space inverse-dynamics module 2000 and/or from one or more controller modules 806 and that is arranged to determine weighted and/or mixed and/or combined wrenches to be applied using the received data and to then output data representing its determined wrenches to the physics engine module 808.

FIG. 22 is a flowchart schematically illustrating a method 2200 according to an embodiment of the invention. The method 2200 is the processing of animation update step 900 and producing a single video frame thereafter and is the same as is shown in FIG. 9 except that it includes a step S2202 which involves the joint-space inverse-dynamics module 2000 performing inverse-kinematics calculations and joint-space control calculations in order to determine one or more wrenches to be applied at/to one or more respective object parts of the object 200 in order to try to align control frames 702 with target frames 704 to achieve a target object configuration.

It will be appreciated that the methods 2100 and 2200 have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although FIG. 1 and the discussion thereof provide an exemplary computing architecture and computer, this is presented merely to provide a useful reference in discussing various aspects of the invention. Of course, the description of the architecture has been simplified for purposes of discussion, and it is just one of many different types of architecture that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

As described above, the system 100 comprises a computer 102. The computer 102 may be a dedicated games console specifically manufactured for executing computer games, a personal computer system, a mainframe, a minicomputer, a server, a workstation, a notepad, a personal digital assistant, or a mobile telephone, or, indeed, any other computing platform suitable for executing embodiments of the invention.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers over a network, etc.

The invention claimed is:

1. A method of animating a virtual object within a virtual world, comprising:
   in an automated operation using one more processors, performing a series of animation update steps for the virtual object, wherein the virtual object comprises a plurality of object parts, wherein a first object part from the plurality of object parts includes one or more associated second object parts;

wherein a respective animation update step comprises:
   (i) specifying a target frame of reference in the virtual world for the first object part having an elastic connection to a control frame of reference for the first object part;
      wherein the control frame of reference comprises a current position and a current orientation for the first object part; and
      wherein the target frame of reference comprises a target position and a target orientation for the first object part;
      wherein a respective additional control frame of reference exists concurrently with the control frame of reference for each of the one or more second object parts as having a rigid connection to the target frame of reference; and
   (ii) concurrently applying a first control and a second control, the first control applied in isolation to the first object part in accordance with a resiliency of the elastic connection to move the first object part towards an updated target frame of reference;
      wherein an updated target position of the updated target frame of reference represents a first reduction of a difference between the current position and the target position;
      wherein an updated target orientation of the updated target frame of reference represents a second reduction of a difference between the current orientation and the target orientation; and
   (iii) based on applying the second control in isolation to a particular object part of the one or more second object parts:
      establishing the rigid connection that exists between the particular object part and the target frame of reference as existing between the particular object part and the updated target frame of reference, which comprises:
         establishing a rigid connection between the additional control frame of reference for the particular object part and the updated target frame of reference.

2. The method of claim 1, in which each respective frame of reference defines a respective origin and set of axes.

3. The method of claim 1, in which a respective control is a first virtual wrench comprising at least one of a virtual force and a virtual torque.

4. The method of claim 1, wherein establishing the rigid connection that exists between the particular object part and the target frame of reference as existing between the particular object part and the updated target frame of reference comprises:
   determining a current position of an additional control frame of reference for the particular object part with respect to the target position of the target frame of reference; and
   determining a current orientation of the additional control frame of reference for the particular object part with respect to the target orientation of the target frame of reference.

5. The method of claim 4, wherein establishing a rigid connection between the additional control frame of reference for the particular object part and the updated target frame of reference comprises:
   maintaining the current position of the additional control frame of reference for the particular object part with respect to the updated target frame of reference due to a rigidity of the rigid connection to the updated target frame of reference.

6. The method of claim 5 wherein maintaining the current position of the additional control frame of reference for the particular object part with respect to the updated target frame of reference due to a rigidity of the rigid connection to the updated target frame of reference comprises:
   identifying a position difference between the current position of the additional control frame of reference and the target position of the target frame of reference; and
   establishing the position difference between the current position of the additional control frame of reference and the updated target position of the updated target frame of reference.

7. The method of claim 5, wherein maintaining the current orientation of the additional control frame of reference for the particular object part with respect to the updated target frame of reference due to the rigidity of the rigid connection to the updated target frame of reference comprises:
   identifying an orientation difference between the current orientation of the additional control frame of reference and the target orientation of the target frame of reference; and
   establishing the orientation difference between the current orientation of the additional control frame of reference and the updated target orientation of the updated target frame of reference.

8. A computer system comprising:
a processor;
a memory device holding an instruction set executable on the processor to cause the computer system to perform operations comprising:
wherein a virtual object in a virtual world comprises a plurality of object parts;
specifying a target frame of reference in the virtual world for a first object part having an elastic connection to a control frame of reference for the first object part;
   wherein the control frame of reference comprises a current position and a current orientation for the first object part; and
   wherein the target frame of reference comprises a target position and a target orientation for the first object part;
   wherein a respective additional control frame of reference exists concurrently with the control frame of reference for each of the one or more second object parts as having a rigid connection to the target frame of reference;
concurrently applying a first control and a second control, the first control applied in isolation to the first object part in accordance with a resiliency of the elastic connection to move the first object part towards an updated target frame of reference;
   wherein an updated target position of the updated target frame of reference represents a first reduction of a difference between the current position and the target position;
   wherein an updated target orientation of the updated target frame of reference represents a second reduction of a difference between the current orientation and the target orientation; and
based on applying the second control in isolation to a particular object part of the one or more second object parts:

establishing the rigid connection that exists between the particular object part and the target frame of reference as existing between the particular object part and the updated target frame of reference, which comprises:
establishing a rigid connection between the additional control frame of reference for the particular object part and the updated target frame of reference.

9. A non-transitory storage medium storing a computer program which, when executed by a computer, carries out a method of animating a virtual object within a virtual world, wherein the virtual object comprises a plurality of object parts, wherein for a first object part there is one or more associated second object parts, the method comprising:
specifying a target frame of reference in the virtual world for a first object part having an elastic connection to a control frame of reference for the first object part;
wherein the control frame of reference comprises a current position and a current orientation for the first object part; and
wherein the target frame of reference comprises a target position and a target orientation for the first object part;
wherein a respective additional control frame of reference exists concurrently with the control frame of reference for each of the one or more second object parts as having a rigid connection to the target frame of reference;
concurrently applying a first control and a second control, the first control applied in isolation to the first object part in accordance with a resiliency of the elastic connection to move the first object part towards an updated target frame of reference;
wherein an updated target position of the updated target frame of reference represents a first reduction of a difference between the current position and the target position;
wherein an updated target orientation of the updated target frame of reference represents a second reduction of a difference between the current orientation and the target orientation; and
based on applying the second control in isolation to a particular object part of the one or more second object parts:
establishing the rigid connection that exists between the particular object part and the target frame of reference as existing between the particular object part and the updated target frame of reference, which comprises:
establishing a rigid connection between the additional control frame of reference for the particular object part and the updated target frame of reference.

* * * * *